(12) United States Patent
Lo et al.

(10) Patent No.: US 11,457,486 B2
(45) Date of Patent: Sep. 27, 2022

(54) COMMUNICATION DEVICES, SYSTEMS, AND METHODS

(71) Applicants: Kendrick Lo, Toronto (CA); Gregory Dominic Ponesse, Toronto (CA)

(72) Inventors: Kendrick Lo, Toronto (CA); Gregory Dominic Ponesse, Toronto (CA)

(*) Notice: Subject to any disclaimer, the term of this patent is extended or adjusted under 35 U.S.C. 154(b) by 0 days.

(21) Appl. No.: 17/339,998

(22) Filed: Jun. 5, 2021

(65) Prior Publication Data

US 2021/0385886 A1 Dec. 9, 2021

Related U.S. Application Data

(60) Provisional application No. 63/036,431, filed on Jun. 8, 2020, provisional application No. 63/045,090, filed on Jun. 27, 2020.

(51) Int. Cl.
*H04W 76/10* (2018.01)
*H04W 4/80* (2018.01)

(52) U.S. Cl.
CPC ............. *H04W 76/10* (2018.02); *H04W 4/80* (2018.02); *H04R 2430/01* (2013.01)

(58) Field of Classification Search
CPC ....... H04W 4/80; H04W 76/10; H04W 76/15; H04W 84/20; H04R 2430/01; H04R 2225/55
See application file for complete search history.

(56) References Cited

U.S. PATENT DOCUMENTS

| 7,539,486 B2 | 5/2009 | Seligmann |
| 7,899,445 B2 | 3/2011 | Guccione |
| 8,126,129 B1 | 2/2012 | McGuire |
| 8,401,520 B2 | 3/2013 | Govindachari et al. |
| 9,743,229 B2 | 8/2017 | Moldavsky et al. |
| 10,034,160 B2 | 7/2018 | Song et al. |
| 10,250,751 B2 | 4/2019 | Gossen et al. |

(Continued)

FOREIGN PATENT DOCUMENTS

| KR | 1020060081774 B1 | 7/2006 |
| KR | 1020080071379 A | 8/2008 |
| WO | 2006116937 A1 | 4/2006 |

OTHER PUBLICATIONS

Google, Nearby Connections API Overview, Web Article, Nov. 28, 2018, Retrieved from the Internet at https://developers.google.com/nearby/connections/overview#advertising_and_discovery.

(Continued)

*Primary Examiner* — Tuan H Nguyen
(74) *Attorney, Agent, or Firm* — Bereskin & Parr LLP/S.E.C.R.L., s.r.l.

(57) ABSTRACT

Devices, systems, and methods for enabling voice communications between a plurality of mobile device users are disclosed. At least one embodiment described herein is directed to a method of establishing a short-range wireless connection for voice communications between multiple mobile devices, where the method comprises detecting one or more second mobile devices within a short-range wireless communication range of a first mobile device, and for each of at least one of the one or more second mobile devices establishing the short-range wireless connection between the first and second mobile devices, where the connection is established automatically in response to the detecting.

18 Claims, 12 Drawing Sheets

(56) References Cited

U.S. PATENT DOCUMENTS

| | | | |
|---|---|---|---|
| 10,390,122 | B2 | 8/2019 | Degraye et al. |
| 11,281,164 | B1 * | 3/2022 | Richards .................. G04F 3/08 |
| 2003/0044654 | A1 | 3/2003 | Holt |
| 2008/0220825 | A1 | 9/2008 | Wu |
| 2014/0193007 | A1 | 7/2014 | Solum |
| 2016/0366263 | A1 * | 12/2016 | Song .................. H04R 25/554 |
| 2018/0027033 | A1 | 1/2018 | Kamstrup |
| 2019/0230738 | A1 | 7/2019 | Desai et al. |
| 2019/0349718 | A1 | 11/2019 | Kwon |

OTHER PUBLICATIONS

Balin, Building P2P networks with the help of Bluetooth on iOS and Android devices, Web Article, Nov. 15, 2013, Retrieved from the Internet at https://www.dbbest.com/blog/data-transfer-between-ios-and-android-devices-using-wi-fi/.

Dawra et al., Voice Over Bluetooth: An Overview, Web Article, Jan. 2012, IJCST vol. 3, Issue 1; Retrieved from the Internet at https://pdfs.semanticscholar.org/cf98/80e5a2c771f177f054330ee2d99bd9285a40.pdf.

Infinite Buffer, Intercom for Android, Web Article, May 28, 2020, Retrieved from the Internet at https://play.google.com/store/apps/details?id=com.androidintercom&hl=en.

Slide2talk, Slide2Talk: WiFi walkie-talkie/intercom, May 25, 2020, Retrieved from the Internet at https://play.google.com/store/apps/details?id=com.slide2talk.android.app&hl=en.

Mic, Talk Bluetooth, Web Article, Mar. 14, 2017, Retrieved from the Internet at https://play.google.com/store/apps/details?id=mlc.talkbluetooth&hl=en%20*.

Cipriani, Here's how easy it is to use iOS 13's Audio Share feature with your AirPods, Web Article, Jan. 20, 2020, Retrieved from the Internet at https://www.cnet.com/how-to/heres-how-easy-it-is-to-use-ios-13s-audio-share-feature-with-your-airpods/.

Dolan, What to Expect From the Future of LE Audio, Web Article, May 20, 2020, Retrieved from Internet at What to Expect From the Future of LE Audio.

Pachal, LE Audio's Most Game-Changing New Feature Is Broadcast Audio, Web Article, Jan. 17, 2020, Retrieved from the Internet at https://www.bluetooth.com/blog/le-audios-most-game-changing-new-feature-is-broadcast-audio/.

Nikolskiy, Talkie—Wi-Fi Calling, Chats, File Sharing, Web Article, Jan. 6, 2018, Retrieved from the Internet at https://play.google.com/store/apps/details?id=com.remaller.android.wifitalkie_lite&hl=en.

Bluetooth Core Specification Working Group, Supplement to the Bluetooth Core Specification, Web Article, Dec. 31, 2019, Retrieved from the Internet at https://www.bluetooth.com/specifications/bluetooth-core-specification/.

Woolley, Bluetooth Core Specification Version 5.2 Feature Overview, Web Article, Jan. 6, 2020, Retrieved from the Internet at https://www.bluetooth.com/wp-content/uploads/2020/01/Bluetooth_5.2_Feature_Overview.pdf.

Liszewski, The Biggest Problem With Bluetooth Audio Are About to Be Fixed, Web Article, Jan. 6, 2020, Retrieved from the Internet at https://gizmodo.com/the-biggest-problems-with-bluetooth-audio-are-about-to-1840461602.

Domio, Motopro Helmet Audio + Communication System, Web page, Jun. 25, 2020, Retrieved from the Internet at https://domiosports.com/products/motopro-bluetooth-helmet-speakers.

Bluetooth Core Specification Working Group, Bluetooth Core Specification v. 5.2, pp. 1-1621, Web Article, Dec. 31, 2019, Retrieved from the Internet at https://www.bluetooth.com/specifications/bluetooth-core-specification/.

Bluetooth Core Specification Working Group, Bluetooth Core Specification v. 5.2, pp. 1622-3256, Web Article, Dec. 31, 2019, Retrieved from the Internet at https://www.bluetooth.com/specifications/bluetooth-core-specification/.

* cited by examiner

COMMUNICATION DEVICES, SYSTEMS, AND METHODS

CROSS-REFERENCE TO RELATED APPLICATIONS

The present application claims the benefit of U.S. Provisional Patent Application No. 63/036,431 entitled COMMUNICATION DEVICES, SYSTEMS, AND METHODS filed Jun. 8, 2020 and of U.S. Provisional Patent Application No. 63/045,090 entitled COMMUNICATION DEVICES, SYSTEMS, AND METHODS filed Jun. 27, 2020; the disclosures of said U.S. Provisional Patent Application Nos. 63/036,431 and 63/045,090 are incorporated by reference herein in their entirety.

FIELD

Embodiments of the present technology relate generally to devices, systems, and methods for enabling communication between a plurality of mobile device users, and more particularly, to devices, systems, and methods for enabling voice communications between mobile device users.

BACKGROUND

With improvements in computer hardware and network speeds, video conferencing technology has grown in popularity, both for business and personal applications. This has especially been the case with the restrictions on social interactions brought about by the Covid-19 pandemic.

Notwithstanding the widespread use of video conferencing platforms, there may still be reasons why people would rather see others they wish to talk to, in person. If they do want to converse with others in person, they can meet and talk face-to-face.

SUMMARY

In one broad aspect, there is provided a method of establishing a communications connection between a plurality of mobile devices, each mobile device being connectable to a respective audio device, wherein the method comprises, at a first mobile device: verifying that a first audio device is connected to the first mobile device; detecting, using a short-range wireless communication protocol, that a second mobile device to which a second audio device is connectable is within communication range of the first mobile device; and in response to the detecting, establishing, between the first and second mobile devices, a wireless, audio communications connection for transmitting both input received at the first mobile device to the second audio device and input received at the second mobile device to the first audio device.

In another broad aspect, there is provided a method of establishing a communication connection between a plurality of mobile devices, each mobile device being connectable to a respective audio device, wherein the method comprises, at a first mobile device: verifying that a first audio device is connected to the first mobile device; detecting, using a short-range wireless communication protocol, that a second mobile device to which a second audio device is connectable is within communication range of the first mobile device; and in response to the detecting, establishing, between the first and second mobile devices, a wireless, audio communications connection for transmitting both input received from the first audio device to the second audio device and input received from the second audio device to the first audio device.

In another broad aspect, there is provided a method of establishing a short-range wireless connection for voice communications between a plurality of mobile devices, the method performed by at least one processor of a first mobile device, wherein the method comprises: detecting one or more second mobile devices within a short-range wireless communication range of the first mobile device; and for each of at least one of the one or more second mobile devices: establishing, in accordance with a short-range wireless standard, the short-range wireless connection for voice communications between the first mobile device and the second mobile device; wherein the establishing is performed automatically in response to the detecting.

In another broad aspect, there is provided a method of establishing a short-range wireless connection for voice communications between a plurality of mobile devices, the method performed by at least one processor of a first mobile device, wherein the method comprises: verifying that a first audio device is communicatively coupled to the first mobile device; detecting one or more second mobile devices within a short-range wireless communication range of the first mobile device; from the one or more second mobile devices, determining a subset of second mobile devices; wherein the determining comprises identifying which of the one or more second mobile devices are being operated by potential conversation participants, the identifying based on at least an indication, received from each of the one or more second mobile devices, of whether a respective second mobile device is communicatively coupled to a respective second audio device; and establishing, in accordance with a short-range wireless communication protocol, the short-range wireless connection for voice communications between the first mobile device coupled to the first audio device and at least one second mobile device, of the subset, coupled to the respective second audio device.

In another broad aspect, there is provided a method of establishing short-range wireless connections for voice communications between a plurality of mobile devices, the method performed by at least one processor of a host mobile device, wherein the method comprises: establishing, in accordance with a first short-range wireless protocol, a first short-range wireless connection for broadcasting voice communications from the host mobile device to a plurality of audience mobile devices; receiving a request from a requesting device of the plurality of audience mobile devices to converse with a user of the host mobile device; in response to the request, further establishing, in accordance with a second short-range wireless protocol, a second short-range wireless connection for transmitting voice communications from the requesting device to at least the host mobile device; and terminating the second short-range wireless connection.

In another broad aspect, there is provided a method of establishing short-range wireless connections for voice communications between a plurality of mobile devices, the method performed by at least one processor of an audience mobile device, wherein the method comprises: establishing, in accordance with a first short-range wireless protocol, a first short-range wireless connection for receiving transmitted voice communications from the host mobile device; transmitting a request to converse with a user of the host mobile device; receiving an indication the request is approved; and further establishing, in accordance with a second short-range wireless protocol, a second short-range wireless connection for transmitting voice communications to at least the host mobile device in response to the receiving.

In another broad aspect, there is provided a method of establishing a short-range wireless connection for voice communications between a plurality of mobile devices, the method performed by at least one processor of a first mobile device, wherein the method comprises: identifying one or more second mobile devices within a short-range wireless communication range of the first mobile device; for each of the one or more second mobile devices: determining, based on at least one category indicator received from the second mobile device, which user category of a plurality of user categories is associated with the second mobile device; wherein at least one of the plurality of user categories is associated with an automatic connection mode, and at least one other of the plurality of user categories is disassociated with the automatic connection mode; and establishing, in accordance with a short-range wireless communication protocol, the short-range wireless connection for voice communications between the first mobile device and the second mobile device; wherein when the user category associated with the second mobile device is associated with the automatic connection mode, the establishing is performed automatically in response to the detecting; and wherein when the user category associated with the second mobile device is not associated with the automatic connection mode, the establishing is performed in response to receiving a confirmation of user acceptance after the detecting.

In another broad aspect, there is provided a method of establishing a short-range wireless connection for voice communications between a plurality of mobile devices, the method performed by at least one processor of a first mobile device, wherein the method comprises: detecting in accordance with a short-range wireless communication protocol, one or more second mobile devices within a short-range wireless communication range of the first mobile device; from the one or more second mobile devices, determining a subset of second mobile devices; wherein the determining comprises identifying which of the one or more second mobile devices are located within a user-configurable maximum distance from the first mobile device, the user-configurable maximum distance being less than the short-range wireless communication range; and establishing the short-range wireless connection for voice communications between the first mobile device and at least one second mobile device of the subset automatically in response to the determining.

In another broad aspect, there is provided a method of establishing a short-range wireless connection for voice communications between a plurality of mobile devices, the method performed by at least one processor of a first mobile device, wherein the method comprises: detecting in accordance with a short-range wireless communication protocol, one or more second mobile devices within a short-range wireless communication range of the first mobile device; from the one or more second mobile devices, determining a subset of second mobile devices; wherein the determining comprises identifying which of the one or more second mobile devices are being operated by users facing a user of the first mobile device; and establishing the short-range wireless connection for voice communications between the first mobile device and at least one second mobile device of the subset automatically in response to the determining.

In another broad aspect, there is provided a method of establishing a short-range wireless connection for voice communications between a plurality of mobile devices, the method performed by at least one processor of a first mobile device, wherein the method comprises: establishing, in accordance with a short-range wireless protocol, the short-range wireless connection for voice communications between the first mobile device and at least one second mobile device, and for voice communications between the first mobile device and at least one third mobile device; first transmitting audio received at the first mobile device from the at least one second mobile device to an audio device communicatively coupled to the first mobile device for playing at a first volume; and second transmitting audio received at the first mobile device from the at least one third mobile device to the audio device for playing at a second volume contemporaneously with the first transmitting; wherein the second volume is less than the first volume.

In another broad aspect, there is provided a first mobile device for establishing a short-range wireless connection for voice communications with one or more second mobile devices, the first mobile device comprising: at least one processor; at least one memory; and at least one short-range wireless communication subsystem; wherein the first mobile device is communicatively couplable to an audio device; and wherein the at least one memory comprises instructions which, upon execution by the at least one processor, causes the at least one processor to perform an embodiment of a method of establishing a short-range wireless connection for voice communications disclosed herein.

In another broad aspect, there is provided a computer-readable medium comprising instructions which, upon execution by at least one processor, cause the at least one processor to perform an embodiment of a method of establishing a short-range wireless connection for voice communications disclosed herein.

BRIEF DESCRIPTION OF THE DRAWINGS

For a better understanding of the present technology, as well as example aspects and features thereof, reference is made to the following description and accompanying drawings, where, in respect of example embodiments.

Figure 1:
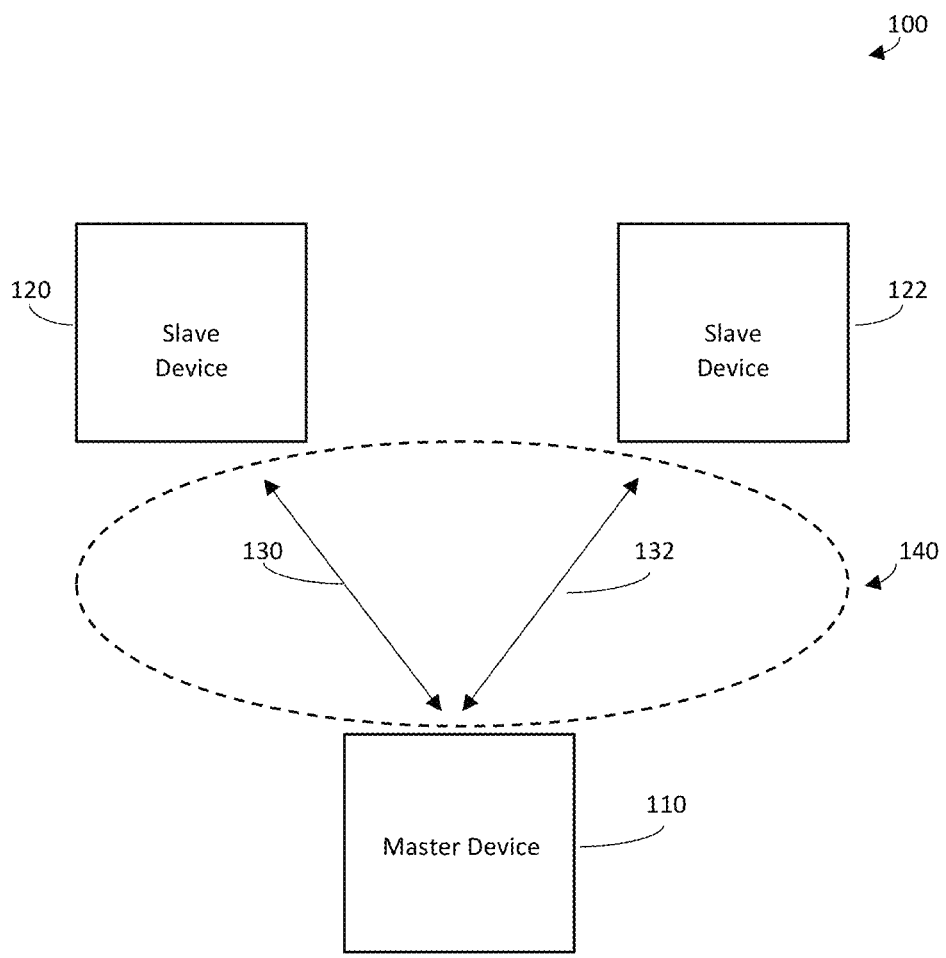
FIG. 1 is a block diagram illustrating an example of Bluetooth connected isochronous streams and a connected isochronous group.

The drawings are not to scale.

DETAILED DESCRIPTION OF EXAMPLE EMBODIMENTS

Most video conferencing platforms allow users to talk to and share information with each other (e.g. via electronic documents, shared screens, virtual whiteboards, etc.) despite being in different physical locations. Camera technology is also typically employed, allowing live video streams of each participant to be broadcast to others.

In situations where in-person meetings are inconvenient, impractical, or otherwise not desired, video conferencing technology can enable users to communicate in a more personal manner compared to audio-only (or text-only) modes of communication. This might be because videoconference participants have the benefit of seeing each other's faces. Accordingly, the ability to observe, to a certain degree, facial expressions and body language of conversation participants over video could be considered an advantage over conventional telephonic solutions.

However, despite the widespread use of video conferencing platforms, and the surge in their popularity in the wake of Covid-19, users may prefer to see others they wish to talk to, in person, for various reasons. For example:

People may yearn for closer contact with others.

They may find video conversations impersonal.

They may find it easier to read body language, maintain eye contact, interpret physical gestures, and/or capture another's attention when talking in person.

They may believe that people are more attentive when all conversation participants can physically see one another.

They may want to more closely monitor the activities of the participants.

They may feel that conversations flow smoother when all participants can see each other, especially for group conversations.

A person may want to authenticate another individual's identity or location, and will only feel comfortable in having done so by meeting in person.

In those situations, the natural alternative then is simply to converse in the known, traditional, low-tech manner—by meeting with and talking to others up close and face-to-face.

But Covid-19 presented new challenges. It was during this pandemic that people began adhering to physical distancing (or "social distancing") practices on an unprecedented global scale. Even in situations where people were close enough to make eye contact, social distancing required that a physical distance between them be maintained.

It was during this time that the Applicant realized the extra distance (e.g., 2+ meters) could make conversations feel unnatural and strained.

For example, as compared to a close-up, face-to-face conversation, participants who are further apart may feel the need to speak louder in order to be heard, especially in noisy environments or when surrounded by others also engaged in conversation. Doing so may cause strain to the voice, allow others to more readily eavesdrop on conversations, and in some cases (e.g., if someone suffers from a respiratory illness), present health risks. It can be even more challenging to converse effectively if one or more speakers are wearing masks or other personal protective equipment (PPE) and/or are separated by a physical barrier (e.g., plexi-glass, plastic, glass, etc.).

Even outside of social distancing contexts, there may be situations where people in close proximity might wish to converse, but where their physical positions or orientations make close-up, face-to-face conversations challenging. As examples, where a group of cyclists or runners are travelling together, or when individuals are dispersed throughout an auditorium or conference room, on a plane, in a living room or lounge, in a boardroom, on a factory floor, or in a hospital room, etc., it may be difficult for participants to readily engage in "normal" conversations without added strain.

Embodiments of the technology described herein can facilitate more effective communication with people near a mobile device user while avoiding close contact. Using earphone and microphone technology, people can converse in-person with one another while still maintaining physical distance.

In at least one embodiment, an application on a user's mobile device executes and causes the mobile device to automatically detect when other potential conversation participants are in close proximity. The application is usable to connect mobile device users together seamlessly, establishing two-way or multi-way communications via their respective audio apparatus, in the manner of a teleconference.

More particularly, in at least one embodiment, a wireless connection between two or more mobile devices discovered to be in close proximity (e.g., within Bluetooth range) is established, such that users of those devices can communicate with one another through the respective audio devices being used with their mobile phones. This may permit, for example, users to carry on conversations in person with each other at a normal speaking volume even when they are physically distancing or otherwise apart.

In one broad aspect, there is provided a method of establishing a communications connection between a plurality of mobile devices, each mobile device being connectable to a respective audio device, wherein the method comprises, at a first mobile device: verifying that a first audio device is connected to the first mobile device; detecting, using a short-range wireless communication protocol, that a second mobile device to which a second audio device is connectable is within communication range of the first mobile device; and in response to the detecting, establishing, between the first and second mobile devices, a wireless, audio communications connection for transmitting both input received at the first mobile device to the second audio device and input received at the second mobile device to the first audio device.

Unless the context indicates otherwise, the term "connection" as used herein (e.g., as in "short-range wireless connection") does not necessarily strictly denote a single connection between two devices but may refer more generally to a plurality of communicative couplings between a plurality of devices.

Embodiments described herein may address certain challenges that are different from some existing technologies involving audio transmissions via mobile phones. For example, the acts for enabling voice communications between two or more mobile device users as described herein may differ from some applications that merely:

facilitate the sharing of music, as listening to music is primarily a passive, "one-way" activity (e.g., mobile device transmitting audio) and often engaged in by a single user;

broadcast live speech to an audience, which is typically also often a "one-way" activity that might not permit listeners to interact with or, sometimes, even see the person who is talking; or provide intercom functionality, where many do not permit the exchange of voice communications contemporaneously—communications between multiple users typically take place sequentially in conventional systems (e.g., in half-duplex mode), requiring each user to manually initiate a one-way voice transmission (e.g., by pressing a button and holding it down while speaking) that occurs without interruption until the transmission is complete.

At least some embodiments of the present technology may also be seen as exploiting the growing popularity of wireless, in-ear audio devices, such as Apple AirPods® and other earbud-type devices.

As earphone and microphone technologies improve, and demands for greater convenience when listening to media via smartphones grow, the use of wireless earbuds by the general population may increase in prevalence. This could, in turn, lead to the adoption of an "always-on" earbud culture, where more and more people are wearing these devices for a longer period of time.

Accordingly, while it may be possible to use a physically integrated microphone and/or speaker of a mobile device as the audio device in variant configurations, most embodiments of the present technology may find greater utility among users who routinely wear earphones or headphones. Unless the context indicates otherwise, the term "audio device" as used herein refers generally to audio devices of a portable nature that can be connected to (e.g., via wired or wireless connection) and disconnected from a mobile device.

In particular, in at least one embodiment, the ability to hold conversations with others nearby with which a user may come into contact can be seamlessly integrated with other activities that users typically engage in while wearing such audio devices, such as listening to music or podcasts, listening to audio output from a mobile device application (e.g., GPS directions, audio books, games, etc.) or even while on a telephone call. The tendency for a user to remove an in-ear audio device in order to converse with others in their vicinity may be minimized or alleviated.

In addition, in some implementations, these conversations may be initiated without the need to interact directly with the mobile device when it has been stored away (e.g., in a pocket, purse, knapsack, bag, belt, etc.).

Still further, as the form factor of earbuds and other wireless audio devices decreases in size, embodiments described herein may also permit in-person, two-way and/or multi-way conversations via mobile devices to be held in an increasingly discreet manner.

Accordingly, in one broad aspect, Applicant's technology may be regarded as implementing a pioneering mode of communication, coined by the Applicant as "ear-to-ear" (E2E). E2E communications are characterized by people conversing through their respective audio devices (typically wireless, microphone-equipped, and of earbud type, although other in-ear, on-ear, or over-the-ear audio devices, whether wired or wireless, and having an integrated microphone or not, may be employed) despite being close enough to engage in an in-person conversation.

At least some embodiments of the present technology may also be seen as exploiting the continuing advances in Bluetooth® standards.

In certain embodiments, acts involving the discovery of nearby mobile devices and the establishment of audio connections between them could be performed using one or more of a variety of wireless protocols, and the protocol(s) used for each need not be the same. For example, Wi-Fi could be employed to detect participants who might want to talk to each other, and the conversation may then take place over a cellular network. Further, a combination of protocols can be relied upon when performing these or related acts. For instance, location detection functionality often utilizes both Wi-Fi and Bluetooth signals. GPS may also be employed.

Nevertheless, there are indications that Bluetooth, a wireless protocol often known for its usability and efficiency in certain applications, is increasing in versatility. For example, in January 2020, the Bluetooth Special Interest Group (SIG), the standards organization for Bluetooth development, introduced Low Energy (LE) Audio, a new standard that extended the functionality of Bluetooth.

Bluetooth LE is one of two major forks of Bluetooth radio operation, the other being Bluetooth Classic. Bluetooth LE caters to low-power, low-bandwidth applications, including those requiring data to be transferred between Internet of Things (IoT)-type devices, such as fitness trackers and the like. Bluetooth Classic, on the other hand, has typically been used for more power-hungry, high-speed data transfer applications. This has historically included audio transmissions between mobile phones and wireless headsets.

LE Audio enables audio data to be transmitted over the lower power and lower bandwidth Bluetooth LE radio. This means that the battery life of audio devices may be better preserved, which may result in increased listening times.

A key enabling component of LE Audio is a newly introduced audio codec (data compression technology) called Low Complexity Communication Codec, or LC3. This codec may provide high quality sound even at very low bit rates.

Furthermore, with the introduction of LC3, Bluetooth provides for the ability to transmit multiple synchronized audio streams over wireless connections by default. This provides for a number of previously unavailable capabilities.

Of particular note, LE Audio provides a capability called audio sharing that facilitates sharing of audio with multiple users, including the broadcasting of audio to mass audiences in public places. Additionally, LE Audio's multi-stream audio functionality allows devices to transmit independent yet synchronized audio streams for a variety of use cases. Due to standardization of these features, interoperability between devices (whether it be mobile devices or audio devices) from different manufacturers who adopt them may be realised.

The foregoing capabilities of LE Audio are enabled by LE isochronous channels, a feature first introduced in the "Bluetooth Core Specification, Revision v. 5.2" (see e.g., https://www.bluetooth.com/specifications/bluetooth-core-specification/). The contents of the specification, in its entirety, are hereby incorporated by reference herein.

The isochronous channels feature uses Bluetooth LE to transfer time-bounded data, including audio data, between devices. It provides a mechanism that ensures multiple sink devices, receiving data from a given source, can render that data at the same time. Data expires at the end of a time-limited validity period, and expired data not yet transmitted is discarded. Receiver devices only receive valid data as defined by age and acceptable latency rules.

Figure 2:
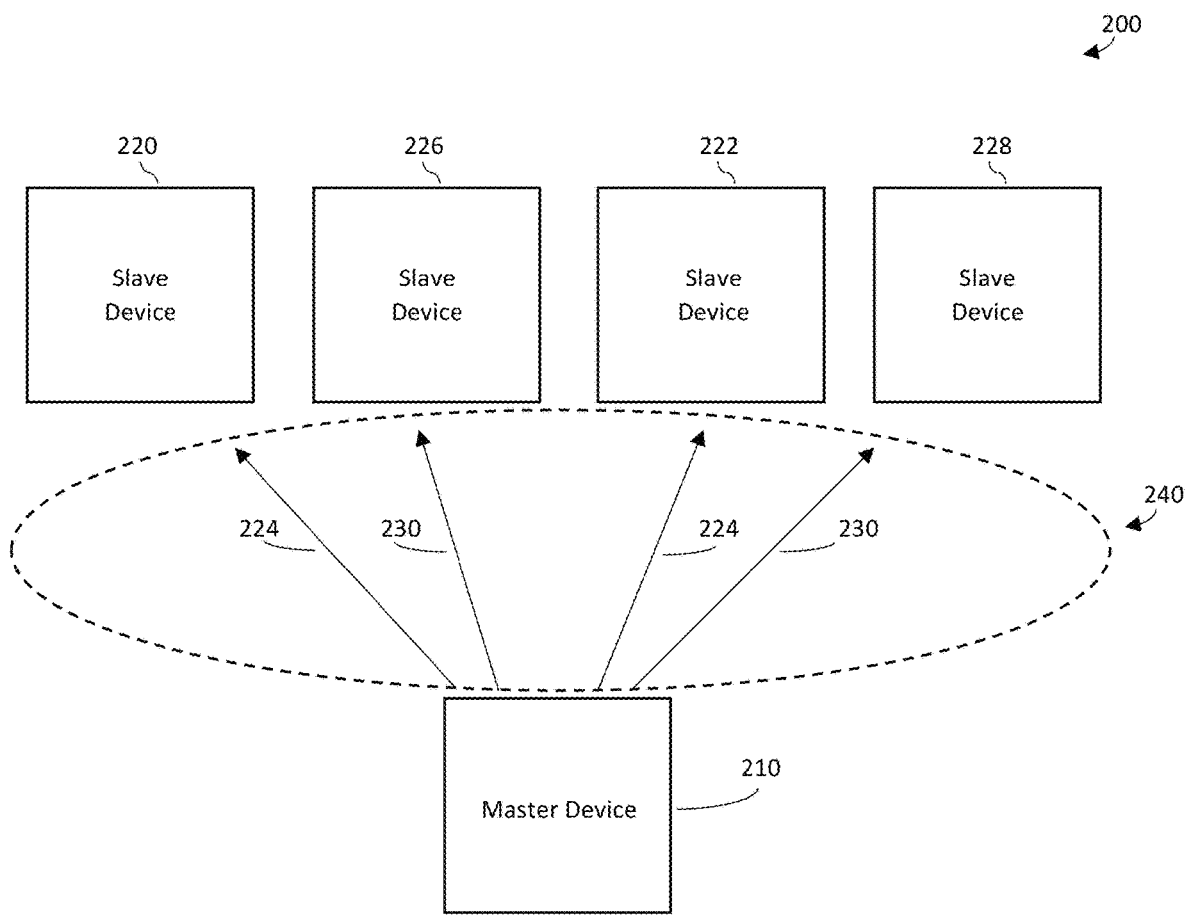
FIG. 2 is a block diagram illustrating an example of Bluetooth broadcast isochronous streams and a broadcast isochronous group.

The Bluetooth data transport architecture supports isochronous channels, which may be connection-oriented (see e.g., FIG. 1) or connectionless (see e.g., FIG. 2).

Referring now to FIG. 1, there is provided a block diagram shown generally as 100, illustrating an example of connected isochronous streams and a connected isochronous group.

Connection-oriented isochronous channels support bi-directional communication between a master device 110 and a slave device 120, 122. Each LE connected isochronous stream (CIS) 130, 132 provides point-to-point isochronous communication between two connected devices. In this example, left-ear audio may be streamed from master device 100 to slave device 120, and vice-versa, over CIS 130; right-ear audio may be streamed from master device 100 to slave device 122, and vice-versa, over CIS 132.

Multiple CIS instances can be grouped into a connected isochronous group (CIG) 140. CIS instances in the same CIG share common timing reference data that is used to synchronize data, such as audio data, received by receiver devices (e.g., slave devices 120, 122) across all streams (e.g., CISs 130, 132) in a group (e.g., CIG 140). CISs 130, 132 may be encrypted.

Referring to FIG. 2, there is provided a block diagram shown generally as 200, illustrating an example of broadcast isochronous streams and a broadcast isochronous group.

Connectionless isochronous communications between a master device 210 and slave devices 220, 222, 226, 228 use broadcast isochronous streams (BIS) 224, 230 and support uni-directional communication. In this example, left-ear audio may be streamed from master device 200 to slave device 220 and slave device 222, over BIS 224; right-ear audio may be streamed from master device 200 to slave device 226 and slave device 228, over BIS 230.

Multiple BIS streams can be grouped into a broadcast isochronous group (BIG) 240, and multiple BIGs may be created by the same master device 210. BIS instances in the same BIG share common timing reference data that is used to synchronize data, such as audio data, received by receiving devices (e.g., slave devices 220, 222, 226, 228) across all broadcast streams (e.g., BISs 224, 230) in a group (e.g., BIG 240). BISs 224, 230 may be encrypted.

Certain implementations of our technology may be enabled using aspects of a Bluetooth standard. In some embodiments, the Bluetooth standard is the Bluetooth LE Audio standard. This may have the benefit of, for example, allowing for more efficient audio transmissions to and from a greater number of users, with power requirements particularly well-suited for use with battery-powered mobile devices, including smartphones. It could also provide opportunities for deployment in areas with inconsistent or absent Wi-Fi or cellular service.

This also means that for at least some implementations, smartphones and audio devices that are readily available for consumer use could be adapted for a variety of use cases. In these situations, users need not acquire specialized hardware (e.g., transmitters, receivers, headsets, microphones, control systems, etc.) to enjoy benefits of the functionality described herein. This may have cost-saving implications, especially for business applications.

Applicant notes that the Bluetooth protocol has occasionally been criticized for its limited connectivity range relative to some other popular wireless protocol alternatives, such as Wi-Fi or cellular. However, Applicant recognized that this "limitation" can be exploited and embraced in at least some of the embodiments described herein. For example, at the instant where a user initiates a conversation with someone else in their vicinity, it may be inferred that those users operating mobile devices that are closest and within Bluetooth range are among the most likely candidates with which the user might want to engage in an in-person conversation. Accordingly, for many of the use cases of Applicant's technology, the purported range "limitations" of Bluetooth would not be a disadvantage.

Further advantages of Applicant's technology will become apparent from the discussion of features, potential operational examples, and example use cases that follows.

Figure 3:
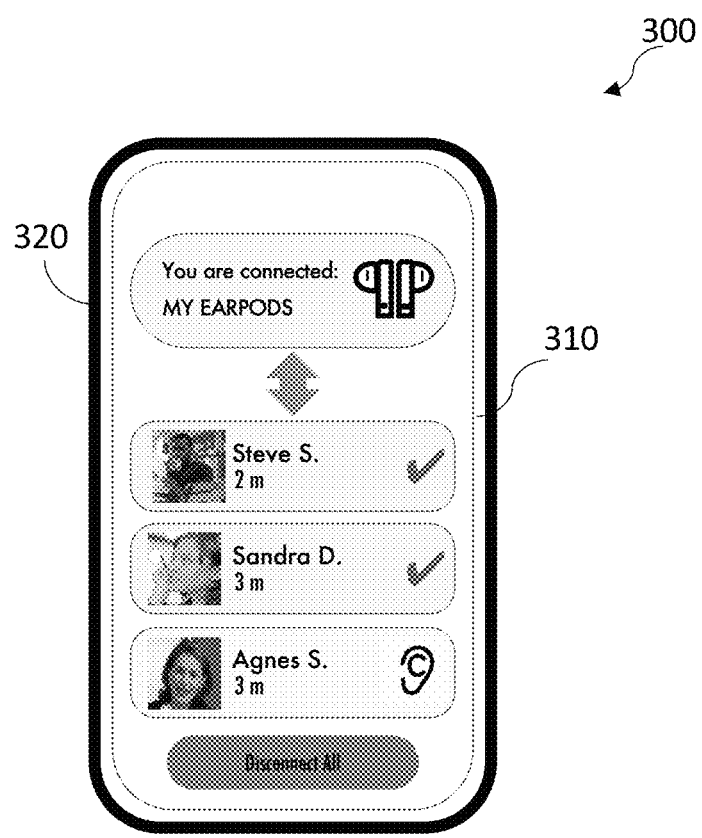
FIG. 3 shows an example of a user interface provided by an application executing on a mobile device.

In at least one embodiment, user-to-user communication is facilitated by their respective mobile devices (e.g., mobile device 1210 of FIG. 12) and an application executing thereon. Referring to FIG. 3, there is shown an example of a user interface provided by such an application shown generally as 300, and as may be displayed on a display 310 of a mobile device 320. The user interface 300 as depicted in FIG. 3 is an example shown for the purposes of illustration only. Different user interface elements and/or arrangements thereof can be employed in various implementations.

Figure 4:
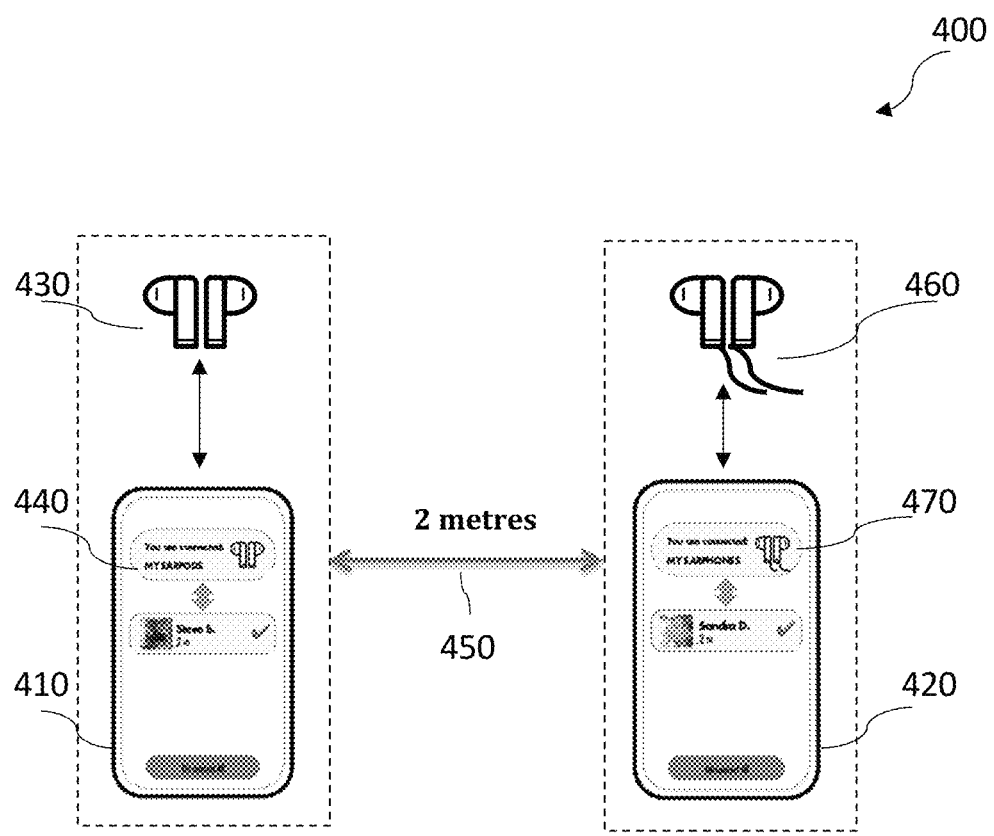
FIG. 4 depicts an example of two-way communication between two mobile devices.

FIG. 4 depicts an example of two-way communication between two mobile devices shown generally as 400. An application executes on each of two mobile devices 410, 420, facilitating voice communications between their respective users. In some embodiments, mobile device 410, 420 may be of the type of mobile device depicted in FIG. 12. Example features associated with two-way communication will be described with reference to FIGS. 4 and 5.

In operation, according to this example, an instance of the application is opened at a first mobile device 410 to which a set of wireless earbuds 430 has been paired (e.g., via Bluetooth). An indication 440 that audio input and output is being transmitted via the earbuds 430 may be displayed on the application screen and/or as an icon elsewhere on the display of the first mobile device. At least one processor (e.g., processor(s) 1220 of FIG. 12) of the first mobile device 410 is configured to detect when an audio device (wireless earbuds 430 in this particular example) is communicatively coupled to the first mobile device 410.

In this example, the first mobile device 410 becomes situated near a second mobile device 420. The two mobile devices 410, 420 are now close enough that both devices are within Bluetooth range of each other. It will be understood that the effective Bluetooth range between any two devices can vary. In this example, the distance between them is shown by way of illustration as two metres, which will routinely be within such a range. It is also likely close enough that the two mobile device users can see each other, even though they may be maintaining physical distance.

Meanwhile, an instance of the application has also been opened on the second mobile device 420 to which, in this example, a set of wired earphones 460 has been connected. However, it should be readily apparent that a wireless audio device (e.g., wireless earbuds) could have been alternatively used. An indication 470 that audio input and output is being transmitted via the earphones 460 may be displayed on the application screen (e.g., display 310 of FIG. 3) and/or as an icon elsewhere on the display of the second mobile device 420. At least one processor (e.g., processor(s) 1220 of FIG. 12) of the second mobile device 420 is configured to detect when an audio device (wired earphones 460 in this particular example) is communicatively coupled to the second mobile device 420.

With both first mobile device 410 and second mobile device 420 now within Bluetooth range of one another, the at least one processor at each respective device is configured to detect the other device, and is also configured to establish a wireless (e.g., Bluetooth) connection 450 over which audio communication will take place between the two mobile devices 410, 420. These acts may be performed seamlessly from each user's perspective, requiring little to no user input.

Once the connection for voice communications between the two mobile devices 410, 420 is established, the respective users of mobile devices 410, 420 can proceed to talk to each other using their respective audio devices 430, 460, as if engaged in a telephone conversation (although no cellular calls are required).

In at least one embodiment, the connection may remain open for communication between the two users until, for example, a disconnect instruction is received at one of the two mobile devices 410, 420, the application is closed by one of the users, or when one of the users moves away such that the two mobile devices 410, 420 are no longer within Bluetooth range.

Figure 5:
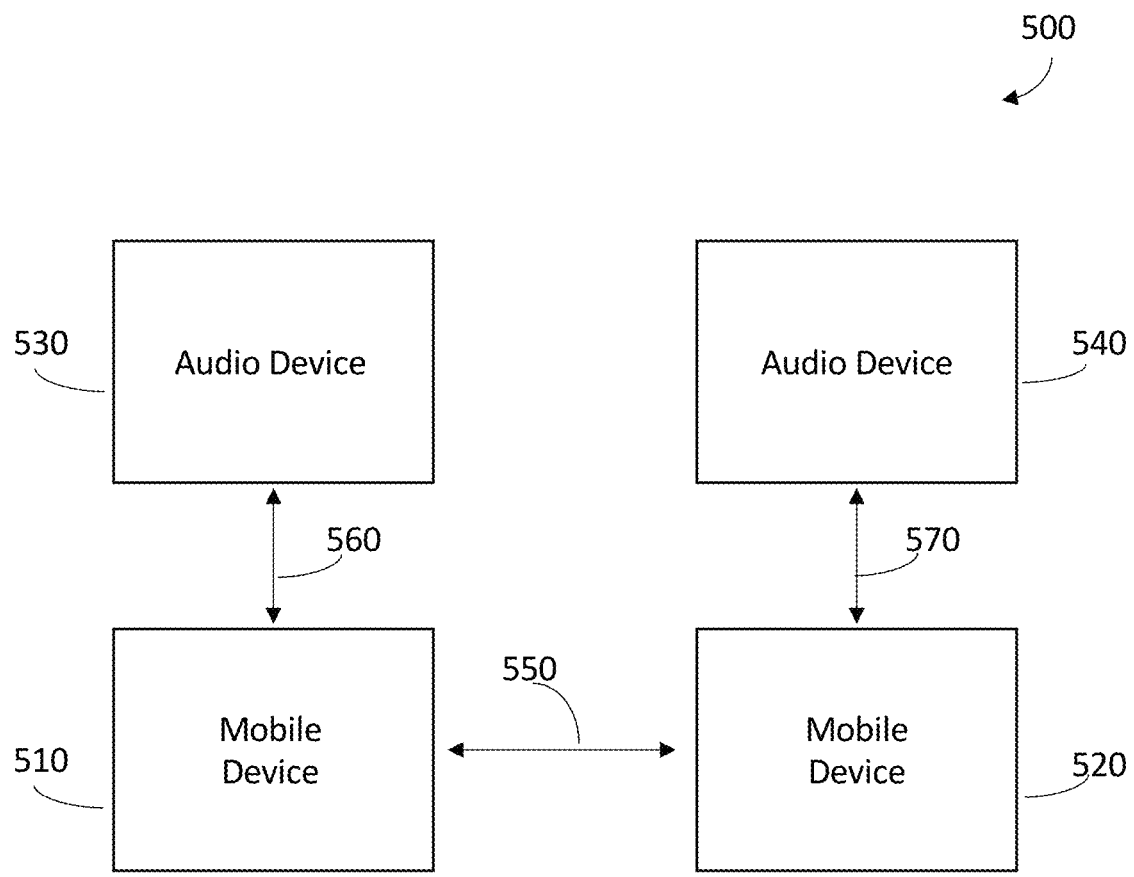
FIG. 5 is a block diagram illustrating one example arrangement of mobile devices connected for two-way voice communications.

FIG. 5 is a block diagram illustrating one example arrangement of mobile devices connected for two-way voice communications, shown generally as 500 in accordance with at least one example embodiment. In some embodiments, each mobile device shown in FIG. 5 may be of the type of mobile device depicted in FIG. 12.

As shown in FIG. 5, voice communications will be transmitted between two mobile devices 510, 520, and communications to and from the respective audio device 530, 540 (e.g., earpods) for a given user will go through that user's own mobile device 510, 520. This may have the benefit of allowing each user to have more flexibility in controlling, for example, properties of their voice data stream (e.g., each user may more readily control the volume of the audio heard through their own audio device).

The two connected mobile devices 510, 520 may co-operate to establish and/or maintain the connection 550 over which voice communications will be transmitted, e.g., in a peer-to-peer networking arrangement. In some embodiments, connection 550 is established and maintained according to a Bluetooth standard. In some embodiments, connection 550 may be implemented using one or more CISs.

Other protocols may be employed in variant embodiments. However, use of a standardized protocol may also enable a mobile device operating on one mobile operating system (e.g., Android, iOS, etc.) to be connected for voice communication with a different mobile device operating on a different mobile operating system.

In some embodiments, one or both mobile devices 510, 520 are connected to a respective audio device 530, 540 via a respective wireless connection 560, 570. In some embodiments, the respective wireless connection 560, 570 comprises a Bluetooth connection. In some embodiments, the respective wireless connection 560, 570 may be implemented using one or more CISs. For example, each respective wireless connection 560, 570 may be implemented using a first CIS representing a left-ear audio stream and a second CIS representing a right-ear audio stream, with the first CIS and second CIS grouped into a CIG.

However, depending on the capabilities and the desired arrangement of the audio devices 530, 540 and mobile devices 510, 520, other configurations may be possible in variant embodiments. For example, one mobile device may act as a hub and connect directly to both audio devices, thus bypassing the other mobile device, at least for the communication of voice signals. The hub may be configured to relay audio transmissions between audio devices. The other mobile device could still play a role (e.g., in setting up and/or maintaining the connection for voice communication, for receiving other media, messages and/or notifications from the hub, etc.) if desired, in some implementations. An audio device 530, 540 may be configured to mix incoming signals originating from multiple sources, including mobile devices 510, 520.

As a further example, in variant embodiments, voice data received from a first microphone (not explicitly shown in FIG. 5) connected to (or integrated in) one user's mobile device (e.g., 510) may be transmitted directly to the other user's audio device (e.g., 540) to be heard, while voice data received from a second microphone (not explicitly shown in FIG. 5) connected to (or integrated in) that second user's mobile device (e.g., 520) may be transmitted directly to the first user's audio device (e.g., 530) to be heard.

Figure 6:
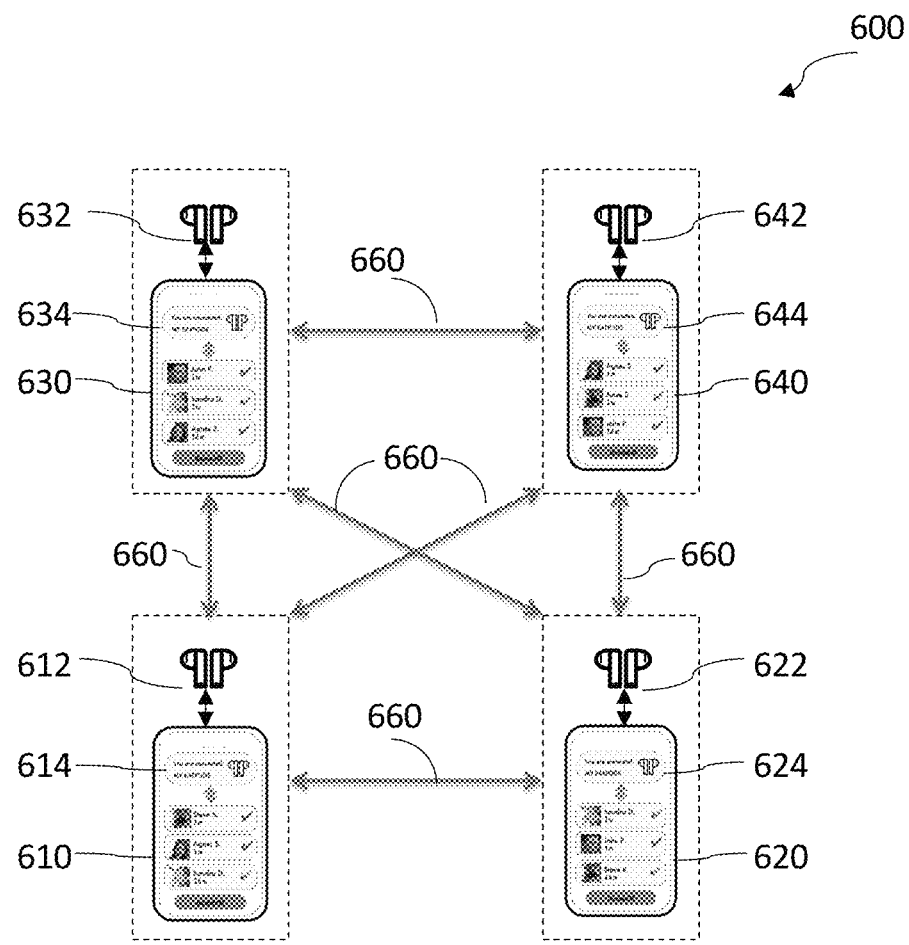
FIG. 6 depicts an example of multi-way communication between multiple mobile devices.

FIG. 6 depicts an example of multi-way communication between multiple mobile devices shown generally as 600. In some embodiments, each mobile device shown in FIG. 6 may be of the type of mobile device depicted in FIG. 12.

In the example shown, an application executes on each of four mobile devices 610, 620, 630, 640 to facilitate voice communications between their respective users. Multi-way communication is also referred to as "group" communication herein.

Multi-way communication (with example features being described with reference to FIGS. 6 and 7) proceeds generally in a manner similar to the preceding two-way example as described with reference to FIGS. 4 and 5, except that wireless communication connections are established over which a conversation between more than two participants can be accommodated. As previously noted, multiple wireless communication connections may be collectively referred to in this specification and in the claims in the singular, generally as a "wireless communication connection".

In operation, according to this example, an instance of the application is executed on each user's mobile device 610, 620, 630, 640 to which a respective audio device 612, 622, 632, 642 has been paired or otherwise connected. The type of audio device used (e.g., wireless earbuds, wired earphones, wired or wireless headsets, etc.) can vary between mobile devices and users.

As similarly described with respect to FIG. 4, an indication 614, 624, 634, 644 of the respective mobile device 610, 620, 630, 640 through which audio input and output is being transmitted can be displayed on the application screen (e.g., display 310 of FIG. 3) and/or as an icon elsewhere on the respective mobile device display. At least one processor of each mobile device 610, 620, 630, 640 is configured to detect when an audio device (wireless earbuds 612, 622, 632, 642 in this particular example) is communicatively coupled to the respective mobile device 610, 620, 630, 640.

In the example shown, there are four users with their respective mobile devices 610, 620, 630, 640 all within Bluetooth range of one another. For the purposes of illustration, the distances between them may range from two to four meters. Then, it is likely that all four users can see one other, even though they may all be maintaining physical distance.

Figure 12:
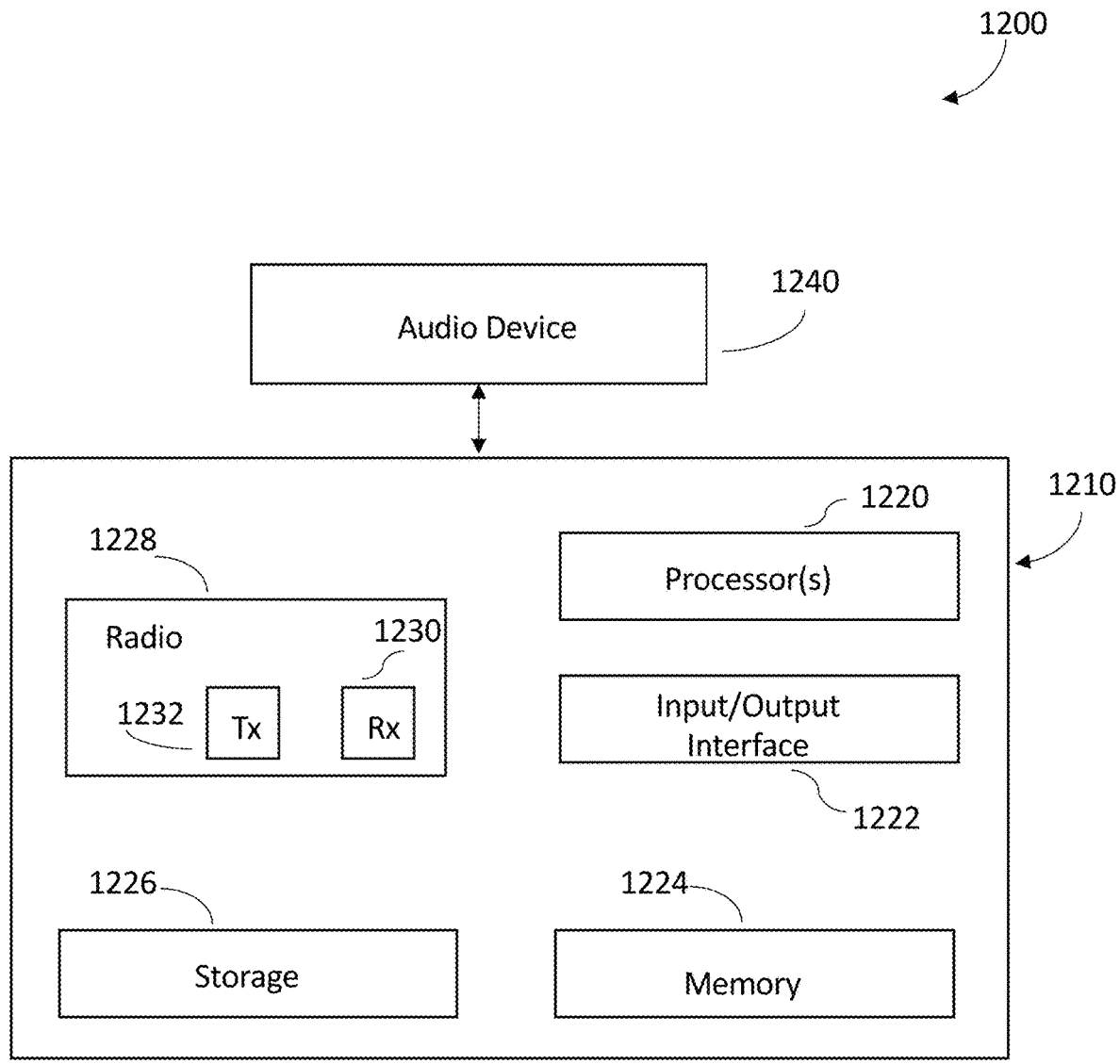
FIG. 12 is a block diagram illustrating example components of a system comprising a mobile device and an audio device.

At least one processor (e.g., processor(s) 1220 of FIG. 12) at each respective mobile device 610, 620, 630, 640 is configured to detect each of the other devices, and is also configured to establish wireless (e.g., Bluetooth) connections 660 over which voice communication between all the participants can simultaneously take place. Again, these acts may be performed seamlessly from each user's perspective, with little to no user input required.

Once the requisite connections between all four mobile devices 610, 620, 630, 640 are established, all users can proceed to converse with one another using their respective audio devices 612, 622, 632, 642, as if engaged in a teleconference (although no cellular calls are required).

In at least one embodiment, connections 660 may remain open for communication between any given user and the other users until, for example, the given user leaves the conversation by selecting a disconnect option from their user interface, or by closing their application. The given user can also move away until they are outside Bluetooth range of the other devices. In any event, in at least one implementation, one or more of connections 660 may be permitted to stay active so that other users may remain engaged in conversation.

Figure 7:
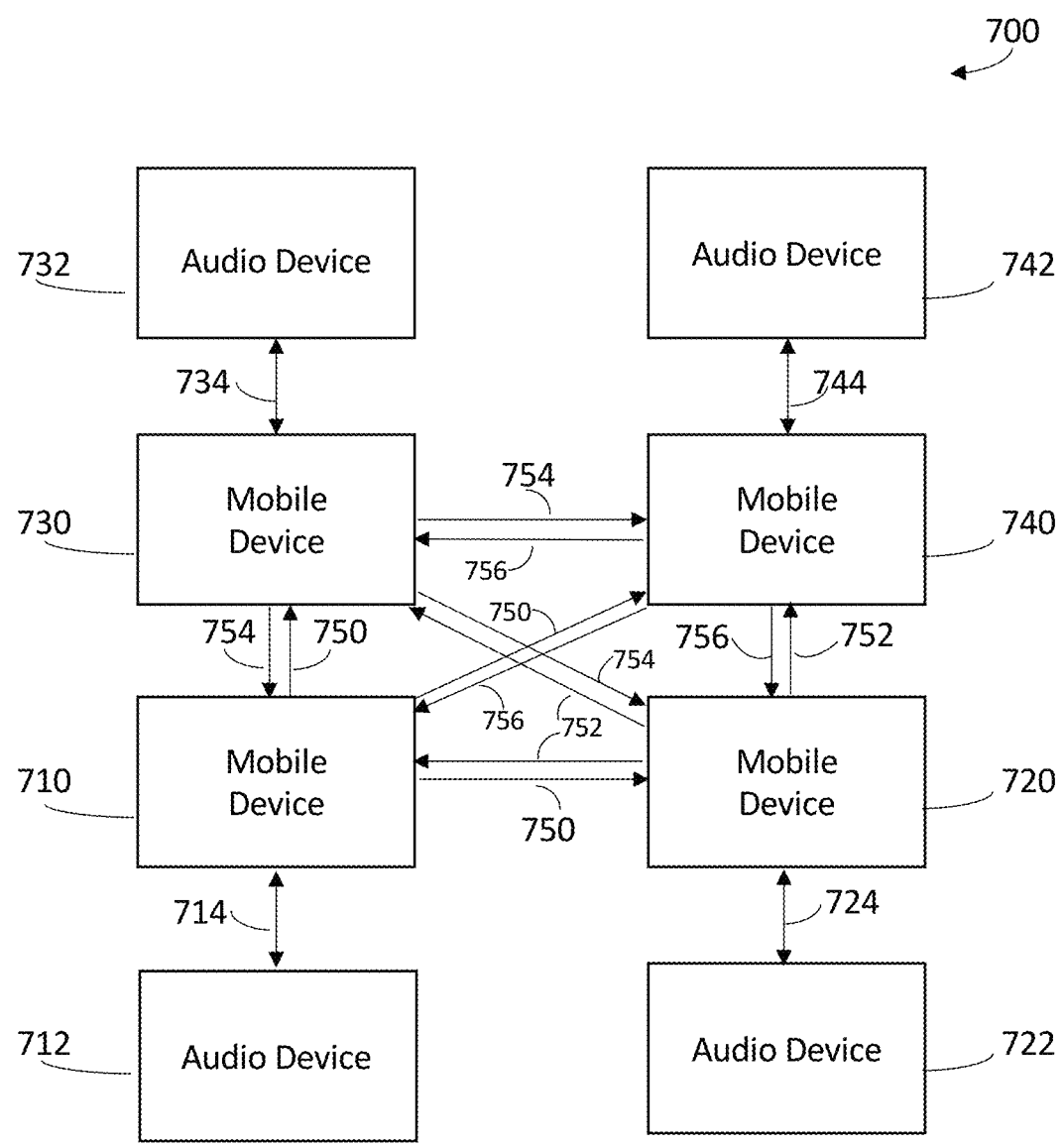
FIG. 7 is a block diagram illustrating one example arrangement of mobile devices connected for multi-way voice communications.

FIG. 7 is a block diagram illustrating one example arrangement of mobile devices connected for multi-way voice communications, shown generally as 700 in accordance with at least one example embodiment. In some embodiments, each mobile device shown in FIG. 7 may be of the type of mobile device depicted in FIG. 12.

Although four mobile devices 710, 720, 730, 740 are shown by way of illustration in FIG. 7, it will be understood that implementations described herein can be scaled appropriately to accommodate multi-way scenarios involving a greater or fewer number of mobile devices.

As shown in FIG. 7, voice communications will be transmitted between four mobile devices 710, 720, 730, 740 and communications to and from the respective audio device 712, 722, 732, 742 (e.g., earpods) for a given user will go through that user's own mobile device 710, 720, 730, 740. This may have the benefit of allowing each user to have more flexibility in controlling, for example, properties of their voice data stream (e.g., each user may more readily control the volume of the audio heard through their own audio device).

In some embodiments, some or all of the mobile devices 710, 720, 730, 740 are connected to a respective audio device 712, 722, 732, 742 via a respective wireless connection 714, 724, 734, 744. In some embodiments, the respective wireless connection 714, 724, 734, 744 comprises a Bluetooth connection. In some embodiments, the respective wireless connection 714, 724, 734, 744 may be implemented using one or more CISs. For example, each respective wireless connection 714, 724, 734, 744 may be implemented using a first CIS representing a left-ear audio stream and a second CIS representing a right-ear audio stream, with the first CIS and second CIS grouped into a CIG.

The connected mobile devices 710, 720, 730, 740 may co-operate to establish and/or maintain wireless connections 750, 752, 754, 756 over which voice communications will be transmitted, e.g., in a peer-to-peer networking arrangement. In some embodiments, connections 750, 752, 754, 756 are established according to a Bluetooth standard.

In some embodiments, connection 750 may be implemented using one or more BISs, with mobile device 710 as the source. For example, connection 750 may be implemented using a first BIS representing a left-ear audio stream and a second BIS representing a right-ear audio stream, with the first BIS and second BIS grouped into a BIG. Similarly, each of connections 752, 754, 756 may be implemented using one more BISs with mobile devices 720, 730, 740 as respective sources. For example, each of connections 752, 754, 756 may be implemented using a respective first BIS representing a left-ear audio stream and a respective second BIS representing a right-ear audio stream, with each pair of respective first and second BISs being grouped into a BIG. Where multiple broadcast streams are received at a mobile device 710, 720, 730, 740, a respective mixer (not explicitly shown in FIG. 7) at each mobile device 710, 720, 730, 740 may be employed to combine audio signals before transmission to the respective audio devices 712, 722, 732, 742.

In some embodiments, connections 750, 752, 754, 756 may alternatively or additionally employ one or more CISs, potentially grouped into one or more CIGs, which may enhance synchronization of transmitted audio signals.

Generally, it will be understood that depending on the desired configuration, the establishment of connections for multi-way communication can be implemented using Bluetooth's multi-stream audio capabilities (e.g., via connected isochronous streams (CIS) and connected isochronous groups (CIG), see FIG. 1), Bluetooth's broadcast audio capabilities (e.g., via broadcast isochronous streams (BIS) and broadcast isochronous groups (BIG), see FIG. 2), or both types in combination.

Other protocols may be employed in variant embodiments. However, use of a standardized protocol may also enable some mobile devices operating on one mobile operating system (e.g., Android, iOS, etc.) to be connected for voice communication with other mobile devices operating on a different mobile operating system.

Depending on the capabilities and the desired arrangement of the audio devices 712, 722, 732, 742 and mobile devices 710, 720, 730, 740, other configurations may be possible in variant embodiments. For example, one or more mobile devices may act as hubs and connect directly to multiple audio devices, thus bypassing some mobile devices, at least for the communication of voice signals. The hub devices may be configured to relay audio transmissions between audio devices. The other mobile devices could still play a role (e.g., in setting up and/or maintaining connections for voice communication, for receiving other media, messages and/or notifications from the hub, etc.) if desired, in some implementations. Some audio devices may be configured to mix incoming signals originating from multiple sources, including from mobile devices 710, 720, 730, 740.

In addition to audio mixing, other signal processing may be applied to audio signals at a given audio device and/or respective mobile device in various implementations, such as setting different volumes for different incoming audio streams, noise filtering, speech correction (e.g., to adjust muffled speech due to PPE use), etc.

As another example, while the mobile devices of at least two users may be configured to permit those users to converse with each other, the remaining users in the group need not all be configured in the same manner. For instance, some of the users may be designated as "listeners-only", where they are permitted to primarily or only listen to conversations, but not to be heard when speaking. In certain implementations, connections for transmitting broadcast audio streams originating from the respective devices of those users might not be established, or may be established on an as-needed basis. Additionally or alternatively, some of the users may be designated as "speakers-only", where they are permitted to primarily or only speak so as to be heard by others, but not to listen to conversations between other users in the group. In certain implementations, connections for receiving broadcast audio streams originating from other devices might not be established, or may be established on an as-needed basis.

As another example, some of the users may be free to engage in two-way conversations with certain conversation participants, but can be designated as "listeners-only" and/or "speakers-only" with respect to others.

By way of illustration, consider a situation where the audio-equipped mobile devices of employees of a retail establishment are connected so that the employees can converse with each other. If a customer they enters the establishment and wishes to engage with one of the employees, they could simply join a main conversation between employees, allowing all employees to hear and talk to the customer. The requisite connections between devices may be established accordingly.

Alternatively, the customer may permitted to only enter into a two-way conversation with the one employee ("server"). This conversation may be made private, with the conversation between the server and other employees being paused or muted. In a variant implementation, the other employees may be permitted to listen in on the server-customer conversation, and may or may not be permitted to speak to the customer.

As a further alternative, the server may be permitted to continue both conversations simultaneously. The two different conversations may be differentiated in some manner at the server's audio device: e.g., different volumes for different conversations are heard through the audio device, and/or the customer can be heard through one earpiece of the server whereas the other employees can be heard through a different earpiece of the server, etc.

As another example, there may be other connected mobile or computing devices not equipped with an audio device in a system, but which can still "participate" in the group communications. For instance, a computing device (not explicitly shown in FIGS. 6 and 7) configured to listen to and/or record conversations may be connected to one or more audio and/or mobile devices; and/or a computing device (not explicitly shown in FIGS. 6 and 7) configured to broadcast live and/or recorded audio may be connected to one or more audio and/or mobile devices.

As a further example, in some implementations it may be desirable to have voice data received from a microphone connected to (or integrated in) one user's mobile device transmitted directly to another user's audio device to be heard.

Example Operational Modes

Embodiments of the present technology can facilitate conversations between a users and others nearby, whether two-way (see e.g., FIGS. 4 and 5) or multi-way (see e.g., FIGS. 6 and 7), on a short-range wireless communication connection for voice communications according to one or more operational modes.

In typical scenarios, "nearby" users generally means that users are close enough to each other to be reasonably considered as being in the same location and at a distance where eye contact can be made. The adjectives "in-person" and "face-to-face" with respect to communications between users may be afforded similar meanings, and may be used interchangeably herein depending on the context.

At least some embodiments described herein enable automatic detection of nearby application users and subsequent connection to a communication connection for voice communications requiring little to no user interaction which may result in a seamless user experience. Applicant recognized that by automating the detection of and subsequent connection with conversation participants, user convenience may be enhanced, particularly in situations where conversations might arise in a spontaneous manner, i.e., on an ad-hoc basis (compared to e.g., the advanced scheduling of a videoconferencing session) and/or where conversations may be short-lived.

Available operational modes may include one or more of the following, described by way of example and without limitation:

Detect and Converse mode;
Lecture/Conference mode;
Party/Collaboration Room mode.

Example features and use cases for each mode will now be described. Not all features and not all modes need be provided as described below, in any given implementation. It shall be understood that some of the features described with respect to one mode may be applicable to one or more other modes, even if they are only described below for the one mode.

Detect and Converse Mode— Example

In operation, a user may open an application on a mobile device (e.g., mobile device 1210 of FIG. 12) while connected to an audio device (e.g., earbuds, headphones, etc., wired or wireless, preferably equipped with microphone, 1240 of FIG. 12). The user's mobile device automatically detects discoverable other mobile devices within a certain range (e.g., Bluetooth range) and on which an instance of the application is also running. A wireless, audio (e.g., voice) communication connection is then established between some or all of the mobile devices.

In particular, in some embodiments, a subset of all detected mobile devices is determined, where the subset comprises one or more detected mobile devices that are closest to the user's mobile device. Mobile devices that are situated closer to the user's mobile device may be operated by users who are among the most likely candidates to engage in conversation. A voice communication connection may, accordingly, be established between the user's mobile device and one of these closest devices.

The closest mobile devices to be included in the subset can be determined in one or more of a number of ways. For example, the user's mobile device may receive data or some other indication that indicates a detected mobile device is communicatively coupled to a respective audio device. This detected mobile device may be included in the subset, and may represent a mobile device that is ready for E2E communication.

As a further example, the closest mobile devices to include in the subset may be associated with a predefined (e.g., through user configuration and/or device configuration via default application settings) user category, such as "personal" or "private" (these terms may be used interchangeably herein in the specification and in the claims) and/or "merchant". Mobile devices associated with these categories may be operated by individuals that the user would more likely wish to converse with, compared to, for example, mobile device users associated with a general "public" category.

As a further example, the closest mobile devices to include in the subset may be those detected mobile devices that are determined to be less than or equal to some prescribed (e.g., through user configuration and/or device configuration via default application settings) maximum distance from the user's mobile device. For instance, if the maximum distance is set to a narrow range, such as 3 meters, which range may be substantially shorter than the range of the wireless protocol to be employed for the connection (e.g., Bluetooth range), then the subset can be restricted to devices operated by users that are more likely to be within a distance for face-to-face conversation.

In some embodiments, the prescribed maximum distance may be user category-specific. For example, the maximum distance may be set to a narrow range, such as 3 meters, for all categories other than personal contacts, and a wider range for personal contacts. This may have the effect of implementing a filtering mechanism where individuals other than personal contacts (e.g., members of the public) must be quite close to the user before they are to be considered likely candidates for conversation, whereas individuals already known to the user need not be so close before being inferred as likely candidates for conversation.

In some embodiments, a determination of whether the user is likely to be physically facing someone operating a detected mobile device (e.g., using positioning technology and/or visual data) may be made, and the detected mobile device may be included in the subset. This may be based on an inference that individuals determined to be within a user's line of sight are likely candidates for conversation.

In some embodiments, the user's mobile device may be configured to automatically establish a connection to some or all of the mobile devices in the subset upon detection. The user's mobile device may be configured to still permit connections to mobile devices excluded from the subset, but establishment of the connection in those cases may be conditional upon receiving a confirmation of user acceptance at the user's mobile device.

Referring again generally to the establishment of the communication connection, in some embodiments there may be a maximum number of connected devices on a given connection; the cap may be user-configured and/or dependent on the type of connection established.

Once all requisite wireless connections are established, in accordance with the short-range wireless communication protocol being employed, two or more users can participate in conversation via their respective audio devices.

In some embodiments, identifying information of all connected users in the conversation may be displayed on a "home screen", which can include: photo, name, distance and/or connection status (see e.g. FIG. 3); further details may be made available in a profile screen accessible by a selectable option.

In some embodiments, configurable application settings may be available to allow users to, for example:
  control who can "discover" them for conversation (e.g., anyone, only users having specified attributes, contacts only, etc.);
  define a maximum distance range so that only those within the range can connect (e.g., a narrow range can ensure only very close users can connect);
  manually accept or reject some or all discovered users before connecting, and/or to define such an option for specific categories of users;
  create a profile with information for display to other users;
  control what information other users are permitted to see, whether as identifying information on a home screen or on a profile screen; and/or
  control notifications (e.g., signal when a new user is discovered and/or connected, signal when a new user is requesting to be connected, etc.).

The following are some example conversation scenarios involving two or more users that may employ this operational mode:
  Meeting or talking with family, friends, or work colleagues.
  Consumers interacting with customer service representatives (e.g., at a store, bank, restaurant, office reception, some other place of business, etc.).
  Co-workers communicating with each other (e.g., in a hospital room, at a store, in a factory, on an assembly line, in pair programming contexts, etc.).
  Interacting with visitors (e.g., delivery or service personnel, couriers, etc.).
  Communicating with others while performing an activity within a certain area—individuals may be stationary or moving (e.g., cyclists, runners, sports teams, gym users, sporting/entertainment event spectators, tour groups, gamers, etc.).
  Interactions (potentially one-off) with the public (e.g., strangers, dates, etc.).

Applicant recognizes that one could mimic the experience of conversing face-to-face while remaining physically apart by having one user place a phone call to the other(s), or by having all participants dial into a conferencing service. However, these alternatives may be inconvenient and less user-friendly, especially when at least one participant is not known to the other(s) in advance, since conventional systems typically require an advance exchange of call or contact information, and/or potentially numerous additional manual steps to be taken to initiate a call.

Figure 8:
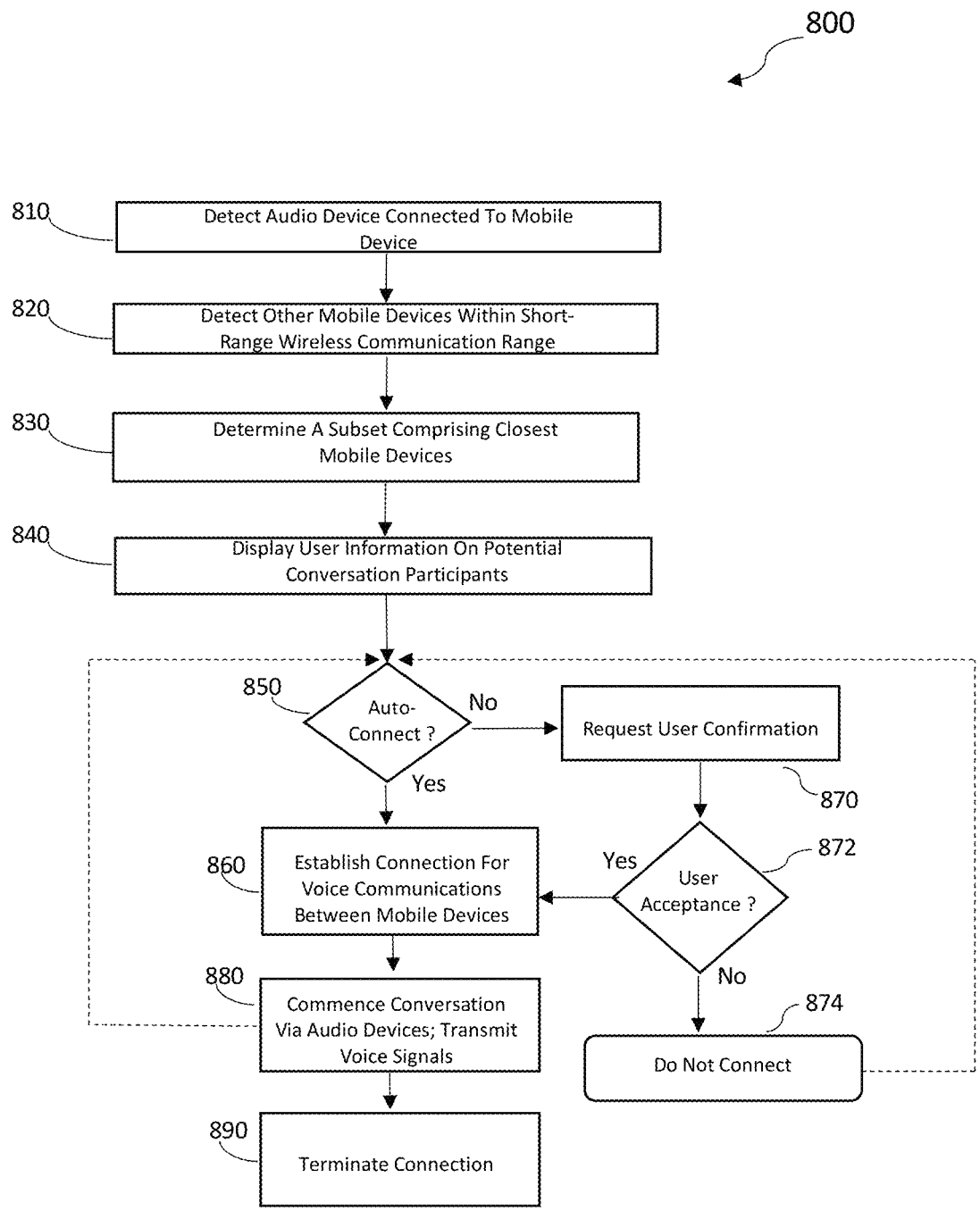
FIG. 8 is a flow diagram illustrating acts of a computer-implemented method of establishing a short-range wireless connection for voice communications between a plurality of mobile devices.

Referring now to FIG. 8, there is provided a flow diagram illustrating acts of a computer-implemented method of establishing a short-range wireless connection for voice communications between a plurality of mobile devices, implementing embodiments of the present technology, and shown generally as 800. Certain aspects of FIG. 8 may have been previously described and/or will be described herein, and the reader is directed to that disclosure for additional detail.

In one or more embodiments, method 800 or one or more acts thereof may be performed at a mobile device (e.g., mobile device 1210 of FIG. 12), comprising at least one processor (e.g., processor(s) 1220 of FIG. 12), at least one memory (e.g., memory 1224 of FIG. 12), and at least one short-range wireless communication subsystem (e.g., wireless communication subsystem 1228 of FIG. 12). The mobile device is communicatively couplable to an audio device (e.g., audio device 1240).

Method 800 or one or more acts thereof may be embodied in computer-executable instructions that are stored on a computer-readable medium, such as a non-transitory computer-readable medium. In some implementations, certain acts or portions thereof as depicted in the flow diagram may be omitted or changed in order.

At 810, the at least one processor of a mobile device detects that an audio device is connected to the mobile device. In particular, the at least one processor detects that the audio device is communicatively coupled to the mobile device for transmitting and/or receiving voice communications. The audio device may comprise, for example, an audio device of earbud type, an audio device of headphone type, etc., whether wired or wireless. The audio device may comprise an in-ear audio device, an on-ear audio device, and/or an over-the-ear audio device. The audio device may comprise a microphone. In some embodiments, the audio device is communicatively coupled to the mobile device via a wireless connection established in accordance with a wireless protocol, such as Bluetooth, for example. In some embodiments, the wireless connection between the audio device and the mobile device may be established in accordance with a Bluetooth Low Energy (LE) Audio standard. In some embodiments, the wireless connection between the audio device and the mobile device may be established via at least one Bluetooth LE isochronous channel.

At 820, the at least one processor of the mobile device detects at least one other mobile device within short-range wireless communication range of the mobile device. This detecting act may comprise determining that the other mobile device, previously out of short-range wireless communication range, has entered short-range wireless communication range of the mobile device. In some embodiments, this detecting act may comprise detecting some or all discoverable mobile devices within Bluetooth range. In some embodiments, this detecting act may comprise detecting some or all discoverable mobile devices within near-field communication (NFC) range. In some embodiments, this detecting act may comprise detecting some or all discoverable mobile devices within Wi-Fi range.

At 830, the at least one processor of the mobile device determines a subset of the at least one other mobile devices detected at 820. In some embodiments, the subset comprises one or more closest mobile devices. These closest mobile devices may comprise other mobile devices whose users are among the most likely candidates to engage or otherwise participate in a conversation with the mobile device user. In some embodiments, user-specific attributes, including for example user-configured settings or user-prescribed categories, may influence which other mobile devices are to be included in the subset. In some embodiments, device-configured default settings may be set, which may influence which other mobile devices are to be included in the subset. In some embodiments, an indication from the at least one other mobile device may be received at the mobile device (receiving act not explicitly shown in FIG. 8), the indication indicating that the respective other mobile device is communicatively coupled to a respective audio device. The subset may then comprise those other devices from which such an indication is received. In some embodiments, the subset comprises one or more other mobile devices associated with a predefined user category (e.g., "personal"). In some embodiments, the mobile device may determine a distance between the mobile device and each other mobile device detected at 820 (this act of determining distance is not explicitly shown in FIG. 8), such that the subset comprises one or more other mobile devices determined to be less than or equal to a prescribed maximum distance from the mobile device. In some embodiments, the subset may comprise other mobile devices selected by the user of the mobile device, e.g., manually selected via a user interface.

At 840, the at least one processor of the mobile device may cause user information on potential conversation participants to be displayed on a display (e.g., display 310 of FIG. 3) of the mobile device, for viewing by the mobile device user. The potential conversation participants may comprise users of one or more mobile devices determined to be in the subset at 830. In some embodiments, the displayed information reflects a ranking of other users based on distance from the mobile device user. The distances may be estimates, depending on the precision of the distance measuring techniques used. In some embodiments, the displayed information may additionally or alternatively identify groups of and/or highlight users based on user category or on some other user attribute.

At 850, the at least one processor of the mobile device determines, for each other mobile device in the subset determined at 830, whether the short-range wireless connection for voice communications should automatically be established between the mobile device and the other mobile device in response to the detecting at 820, which in some embodiments means that no explicit user confirmation is required. Depending on user and/or device configurations, some or all of the other mobile devices in the subset may be subject to automatic connection. For example, based on user and/or device configurations, any mobile device associated with a user from a personal contacts category that is situated within 5 meters may be automatically connected to the user's mobile device once in range. As a further example, any mobile device within 3 meters may be automatically connected to the user's mobile device, with the connection maintained so long as that mobile device remains within that range. In some embodiments, any mobile device not eligible for automatic connection may be excluded from the subset.

If it is determined at 850 that the short-range wireless connection for voice communications should automatically be established between the mobile device and the other mobile device, then the flow of acts of method 800 proceeds to 860.

At 860, the at least one processor of the mobile device establishes the short-range wireless connection for voice communications between the mobile device and the other device, in accordance with a short-range wireless standard. In some embodiments, the wireless standard comprises a Bluetooth Low Energy (LE) Audio standard. In some embodiments, the wireless connection may be established via at least one Bluetooth LE isochronous channel.

However, if it is not determined at 850 that the short-range wireless connection for voice communications should automatically be established between the mobile device and the other mobile device, then in some embodiments, the flow of acts of method 800 proceeds to 870.

When the other device is excluded from the subset (e.g., because it was not eligible for automatic connection as determined at 850 and/or because it was detected as being within range at 820 but was not determined to be part of the subset at 830), the at least one processor of the mobile device may still facilitate establishment of the short-range wireless connection for voice communications where approved by a user, in some embodiments. In this regard, at 870, the at least one processor of the mobile device requests a confirmation of user acceptance from the user at the mobile device. The user may provide the confirmation via a touch option presented in the display, by physical action (e.g., button press, earbud tap, etc.), and/or by voice command (e.g., via personal assistant), as examples. If it is determined, at 872, that the confirmation is received (in certain embodiments, the confirmation needs to be received within a specified time period), then the flow of the acts of the method 800 proceeds to 860 at which the connection is established; otherwise, the flow of the acts of the method 800 proceeds to 874, where the connection between the mobile device and the other device is not established.

In variant embodiments, if it is not determined at 850 that the short-range wireless connection for voice communications should automatically be established between the mobile device and the other mobile device, the flow of acts of method 800 may proceed directly to 874.

After the short-range wireless connection for voice communications is established at 860, conversation between users of the mobile device and the other mobile device over the connection can commence, as shown at 880, until the connection (at least in respect of this particular other mobile device) is terminated at 890.

Acts of transmitting voice signals from the mobile device to the other mobile device over the connection and/or of receiving voice signals from the other mobile device at the mobile device are performed after the connection is established. In some embodiments, the connection between the mobile device and the other mobile device is terminated at 890 when a user of either device leaves the conversation by e.g., selecting a disconnect option from their user interface, closing their application, or moving away until they are no longer within wireless (e.g., Bluetooth) range of each other or until they are no longer within a permissible range given the user category of the other user. In some embodiments, the termination of a connection between the mobile device and the other device will not lead to the termination of connections involving other devices, so that remaining users may remain engaged in conversation.

Acts 850 to 890, and various acts described above with reference to acts 850 to 890, may be repeated for other mobile devices, such as the remaining mobile devices in the subset determined at 830. When processing multiple other mobile devices, these acts may be performed at any two or more mobile devices concurrently or sequentially.

Acts of method 800 may also be performed repeatedly, e.g., from act 820 onward, in order to detect new candidates of other mobile devices that may be potentially connected to the mobile device as they come into range. The new candidates may be processed as previously described to determine whether a connection for voice communications with the mobile device is to be established, and if so, whether the connection will be made automatically.

Lecture/Conference Mode—Example

Typical use cases for this mode involve one or more primary speakers ("host(s)"), and a number of other users who are primarily listeners ("audience member(s)") but who may, occasionally, wish to engage in conversation with the host(s).

In operation, each host opens an instance of an application implementing Applicant's technology on their mobile device while connected to an audio device (e.g., earbuds, headphones, etc., wired or wireless, with microphone); a host mode is selected. Each audience member opens an instance of the application on their mobile device while connected to an audio device (e.g., earbuds, headphones, etc., wired or wireless, with microphone, or potentially without microphone if participating as a "listeners-only" device).

Each audience member's mobile device may automatically detect the host's mobile device when within a certain range; a wireless audio communication connection can then be automatically established, or the connection may first require a host and/or the audience member to manually accept or reject a connection request. Once connected, all audience members can listen to the host(s) speak on the established wireless communication connection. In some embodiments, host(s) may configure their devices to permit some or all audience members to also speak.

In some embodiments, identifying information of all connected users in the conversation may be displayed on a "home screen" (see e.g., FIG. 3), which can include: photo, name, distance and/or connection status; further details may be made available in a profile screen accessible by a selectable option.

In some embodiments, additional configurable application settings may be available to allow, for example:

hosts to control who can "discover" them;
hosts to control notifications (e.g., signal when a new audience member is connected and/or waiting to be connected, etc.);
audience members to request to speak, with hosts being given the option of manually accepting or rejecting specific requests by audience members to speak, or to allow and/or deny all such requests automatically, or to define either or both such options for specific categories of users (may be configured differently for each category);
hosts to converse with an audience member privately (e.g., on a separate connection), or in a manner where other audience members can listen to a host and/or the audience member speak;
users to create a profile with information for display to other users; and/or
users to control what information others are permitted to see, whether as identifying information on the home screen or on the profile screen.

The following are some example conversation scenarios, involving one or more hosts and one or more audience members, that may employ this operational mode:

Speaking or presenting in a room, auditorium, outdoors, in a church, etc.
A host or guide (e.g., tour operator) providing information to participants.
A disc jockey or musician playing music for a group of listeners.
A coach or instructor leading participants (e.g., fitness classes, coaching athletes, classroom settings, etc.).
Co-ordinating a group (e.g., managing employees, security teams, etc.).
An employee at a place of business managing a queue of customers (e.g., lines to enter a store, checkout lines, waiting rooms, etc.).

Applicant recognizes that one could mimic a lecture experience by providing hosts with a microphone and amplifying their speech, or using some other one-way broadcasting system. However, such alternatives might be inconvenient and less user-friendly, especially when audience members may wish to address the host (e.g., by asking a question) and/or each other. The speaking audience member(s) will typically not have ready access to a suitable microphone; without a suitable microphone, the host (and potentially other audience members) may not be able to clearly hear that audience member, and raising the voice may cause strain.

Applicant also recognizes that one could mimic the lecture experience by having participants connect to a conferencing service (e.g., teleconference or videoconference). However, this would typically require an advance exchange of call or contact information and/or potentially numerous additional manual steps to be taken to initiate a call, which may decrease usability.

Nevertheless, in variant implementations, the application may enable hosts to provide a code or hyperlink to potential audience members. In variant implementations, data that will facilitate a connection may be exchanged using a near-field communication protocol or RFID device (e.g., by tapping the mobile device to a reader). These approaches may be used to better ensure all participants connect to the proper connection and host.

Figure 9:
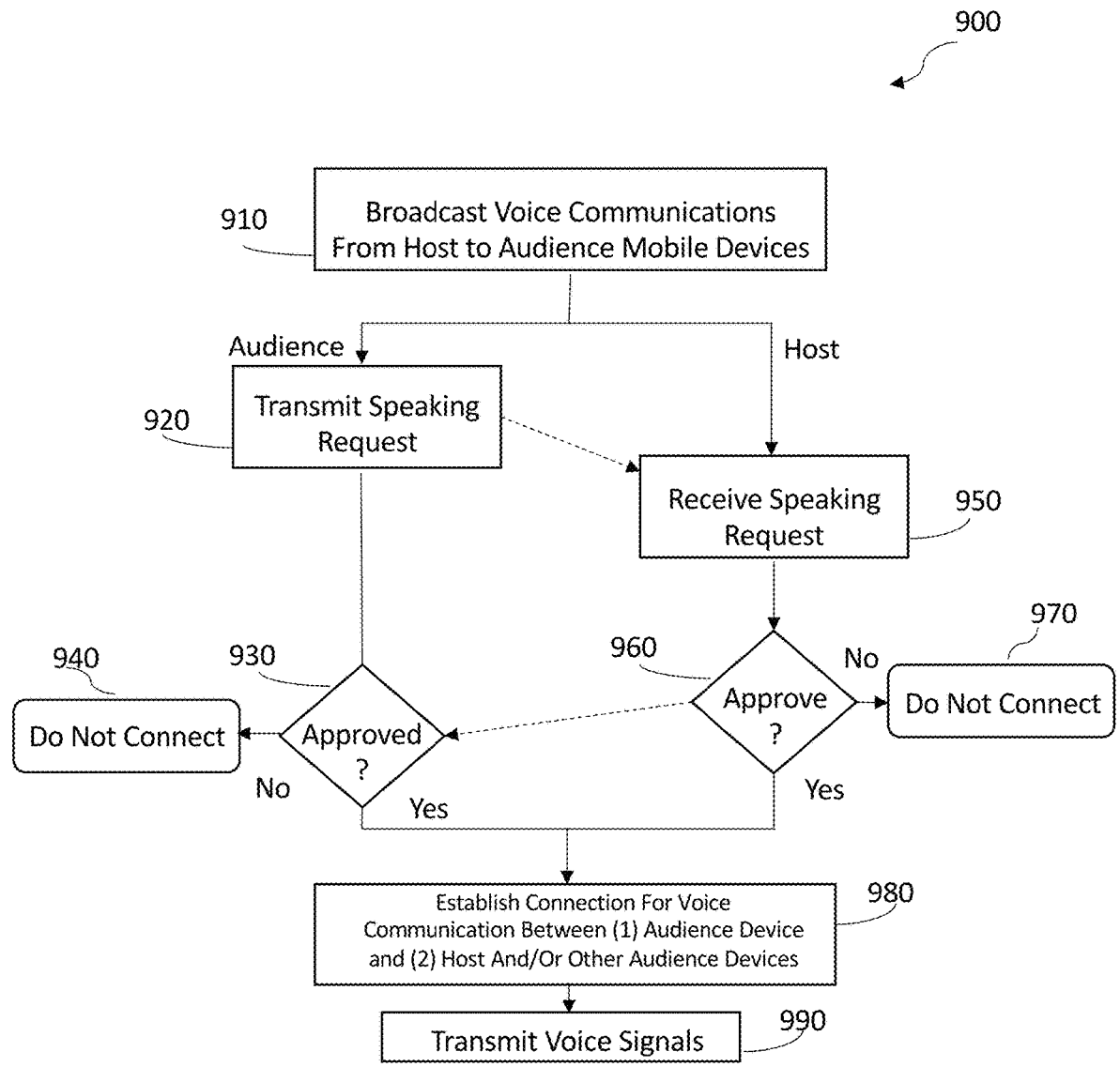
FIG. 9 is another flow diagram illustrating acts of a computer-implemented method of establishing a short-range wireless connection for voice communications between a plurality of mobile devices.

Referring now to FIG. 9, there is provided a flow diagram illustrating acts of a computer-implemented method of establishing a short-range wireless connection for voice communications between a plurality of mobile devices, implementing embodiments of the present technology, and shown generally as 900. Certain aspects of FIG. 9 may have been previously described and/or will be described herein, and the reader is directed to that disclosure for additional detail.

In one or more embodiments, method 900 or one or more acts thereof may be performed at a mobile device (e.g.

mobile device 1210 of FIG. 12), comprising at least one processor (e.g., processor(s) 1220 of FIG. 12), at least one memory (e.g., memory 1224 of FIG. 12), and at least one short-range wireless communication subsystem (e.g., wireless communication subsystem 1228 of FIG. 12). The mobile device is communicatively couplable to an audio device (e.g., audio device 1240 of FIG. 12).

Method 900 or one or more acts thereof may be embodied in computer-executable instructions that are stored on a computer-readable medium, such as a non-transitory computer-readable medium. Certain acts or portions thereof as depicted in the flow diagram may be omitted or changed in order.

Method 900 is generally directed to a use case where users of one or more mobile devices act as hosts, broadcasting voice communications to one or more audience mobile devices, as shown at 910. This is subsequent to an establishment of a connection for voice communications between the host and audience devices. This connection between multiple mobile devices may be established generally in accordance with one or more embodiments of method 800 as previously described with reference to FIG. 8, and the reader is directed to that description for further detail. In particular, after establishing a connection for voice communications between mobile devices (860), voice signals are then transmitted over the connection (880) until the connection is terminated (890).

Referring back to FIG. 9, the connection for voice communications between mobile devices (see e.g., 860 of FIG. 8) has been established between a host mobile device and an audience mobile device. It is during the transmission of voice signals over the connection (see e.g., 880 of FIG. 8), that voice communications are broadcast from the host mobile device to the audience mobile device at 910.

FIG. 9 illustrated acts of method 900 from the different perspectives of the host mobile device and the audience mobile device. While the host mobile device broadcasts voice communications to audience mobile devices, the audience mobile device transmits a speaking request at 920, which comprises a request to converse with a user of the host mobile device. The audience mobile device awaits an indication of host approval ("permission confirmation") at 930, which if not received (potentially within a specified period of time) will result in a denial of an audience speaking connection at 940. Meanwhile, at the host device, the host device will receive the speaking request at 950, which may or may not be approved at 960. The approval (and/or rejection) at 960 can be provided manually (see e.g., 872 of FIG. 8) or automatically (see e.g., 850 of FIG. 8) depending on user and/or device configuration. If not approved, establishment of an audience speaking connection is denied.

If the speaking request is approved, with a permission confirmation being received at the host and audience mobile devices, then a new connection for voice communications between the audience mobile device and the host mobile device is established at 980. This facilitates a two-way conversation between the host and audience mobile devices, through the transmission of voice signals as shown at 990, which will typically not interrupt any existing broadcast and/or conversation over the previously established connection. In some embodiments, the new connection may facilitate a two-way conversation between the audience mobile device and one or more other audience mobile devices already connected to the host mobile device, and/or a one-way broadcast from the audience mobile device to one or more other audience mobile devices. In some embodiments, the new connection may facilitate voice communications between two or more audience mobile devices themselves.

The new connection may be subsequently terminated. This may be done in a manner similar to the termination act previously described with respect to act 890 of FIG. 8.

Party/Collaboration Room Mode—Example

This mode involves a mobile device user engaging in a main conversation with one or more other mobile device users, in a manner similar to a "Detect and Converse" mode as previously described. However, in addition, the user can also connect to others outside of a main conversation taking place on a wireless connection for voice communications so that nearby conversations can be heard via the user's audio device. This may be useful where a group of people are in the same vicinity, and where a user may want to focus on conversing with a subset of individuals while not completely tuning out others.

In operation, a user establishes connections to other mobile devices generally in accordance with the "Detect and Converse" mode as previously described, with reference to FIG. 8; however, an eavesdrop option can be applied to certain designated connected users.

In this mode, the volume of all conversations outside the main conversation (i.e., "side" conversations involving eavesdropped users) is adjusted to be lower than that of the main conversation. This allows a user to listen in on conversations in the periphery of the main conversation while prioritizing the main conversation, in the event they may hear something that prompts them to, for example, interrupt a side conversation and/or bring other users into the main conversation.

In some embodiments, any "eavesdropped" (upon) user(s) may be automatically brought into the main conversation (with the volume increased accordingly) by a user engaged in the main conversation (although the ability to do so can be user configured). This can be done after an explicit request to join the main conversation, or by automatically detecting when an eavesdropped user has started talking with a user already in the main conversation, as examples.

In some embodiments, the functionality of automatically detecting when another user is to become part of the main conversation (e.g., automatically increasing the volume of a side conversation) may be machine learning enabled.

In some embodiments, the eavesdrop option may optionally be applied to a user leaving the main conversation, thus providing an alternative to disconnecting from other users.

In some embodiments, any other users in direct conversation with an eavesdropped user may also be identified on the user's display, potentially also shown and/or connected to as an eavesdropped user.

In addition to one or more features described earlier with respect to other operational modes, in some embodiments, configurable application settings may be available to allow users to, for example:

turn on and off an option to eavesdrop on other users;

turn on and off an option to allow others to eavesdrop on the user's conversation, or to define such an option for specific categories of other users;

control the relative volume of side conversations (e.g., as a fixed percentage of the level of the main conversation, to be proportional to a physical distance determined between users, etc.);

configure what type of user input, if any, is required to switch the user from the main conversation to a side conversation, to disconnect from a given conversation, and/or to bring in/remove others to/from a conversation, etc.; and/or set a distance beyond which eavesdropped users may not connect with the user.

In typical operation, nearby users can be placed in eavesdrop mode so that their conversations can be listened to at a lower volume compared to the volume of a main conversation. However, in some embodiments, one may place users in eavesdrop mode even in the absence of an active main conversation (e.g., if they just want to listen in to that conversation at a lower/background volume, potentially while listening to something else). In some embodiments, the user may prefer to listen to side conversation at an equal volume, or at a greater volume compared to the volume of the main conversation.

Applicant recognizes that in any gathering one might naturally hear conversations taking place in one's surroundings. But prior to Applicant's technology, there may not have been any recognition of a need to conduct conversations via an audio device connected to a mobile phone when face-to-face conversations are natural and/or possible. With the introduction of E2E communications, a mobile device user wearing an audio device might, in theory, be able to still make out conversations or other sounds in their surroundings; however, depending on the nature and volume of what the user is listening to, and potentially on the specific type of audio device used (e.g., if it is of a "noise-cancelling" type), the natural ability to "eavesdrop" while wearing an audio device may be hindered. Accordingly, in at least some embodiments, Applicant's technology will more readily enable users to listen in on surrounding conversations in settings where wireless audio devices are used.

Figure 10:
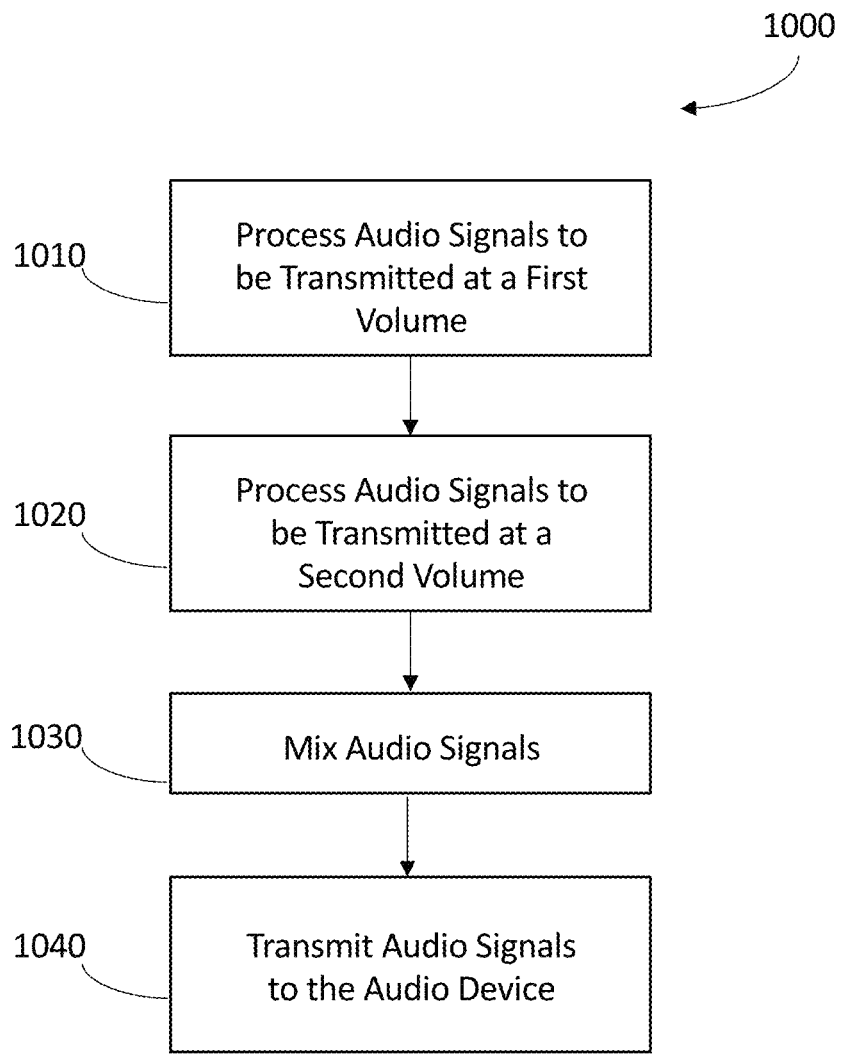
FIG. 10 is another flow diagram illustrating acts of a computer-implemented method of establishing a short-range wireless connection for voice communications between a plurality of mobile devices.

Referring now to FIG. 10, there is provided a flow diagram illustrating acts of a computer-implemented method of establishing a short-range wireless connection for voice communications between a plurality of mobile devices, implementing embodiments of the present technology, and shown generally as 1000. Certain aspects of FIG. 10 may have been previously described and/or will be described herein, and the reader is directed to that disclosure for additional detail.

In one or more embodiments, method 1000 or one or more acts thereof may be performed at a mobile device (e.g., mobile device 1210 of FIG. 12), comprising at least one processor (e.g., processor(s) 1220 of FIG. 12), at least one memory (e.g., memory 1224 of FIG. 12), and at least one short-range wireless communication subsystem (e.g., wireless communication subsystem 1228 of FIG. 12). The mobile device is communicatively couplable to an audio device (e.g. audio device 1240 of FIG. 12).

Method 1000 or one or more acts thereof may be embodied in computer-executable instructions that are stored on a computer-readable medium, such as a non-transitory computer-readable medium. Certain acts or portions thereof as depicted in the flow diagram may be omitted or changed in order.

Method 1000 is generally directed to the transmission of voice signals to the audio device connected to the mobile device (see 810 of FIG. 8). This is subsequent to an establishment of a connection for voice communications between the mobile device and at least one other mobile device. This connection between multiple mobile devices may be established generally in accordance with one or more embodiments of method 800 as previously described with reference to FIG. 8, and the reader is directed to that description for further detail. In particular, after establishing a connection for voice communications between mobile devices (860), voice signals are then transmitted over the connection (880) until the connection is terminated (890).

Referring back to FIG. 10, acts of method 1000 may be performed during the transmission of voice signals over the connection (see e.g., 880 of FIG. 8). At 1010, at least one processor of the mobile device processes audio signals originating from a first source, for transmission to the audio device at a first volume. At 1020, at least one processor of the mobile device processes audio signals originating from a second source, for transmission to the audio device at a second volume. In some embodiments, the processing acts at 1010 and 1020 may be performed in parallel. In some embodiments, the second volume is lower than the first volume, although in other embodiments the two volumes may be equal (or greater).

In some embodiments, the first and second sources are both other mobile devices connected for voice communications (see e.g., 860 and 870 of FIG. 8). In some embodiments, the first source may be associated with one user category, while the second source may be associated with a different user category.

In some embodiments, the first source is one other mobile device connected for voice communications (see e.g., 860 and 870 of FIG. 8), whereas the second source comprises sounds from an environment of the mobile device.

In some embodiments, the first source is one other mobile device connected for voice communications (see e.g., 860 and 870 of FIG. 8), whereas the second source comprises audio generated at the mobile device. The audio generated at the mobile device may be associated with, for example and without limitation: a music application, a podcast application, an audiobook application, a cellular call application, a gaming application, a video application, a social media application, and/or another application executing on the mobile device.

In some embodiments, the audio signals processed at 1010 and the audio signals processed at 1020 may be mixed prior to transmission to the audio device, as shown at 1030. The at least one processor of the mobile device may perform the mixing. In variant implementations, the audio signals may be wholly or partially mixed at the audio device.

At 1040, the audio signals processed at 1010 and the audio signals processed at 1020 are transmitted to the audio device such that the audio signals at the first volume can be perceived contemporaneously with the audio signals at the second volume by a user of the mobile device.

OTHER MODES AND FEATURES

In some embodiments, the "eavesdrop" concept may be applied in a "Lecture/Conference" operational mode. For example, this may permit two or more people to converse in a main conversation while listening to a host talking in the background (i.e., at a lower volume).

As a further example, such a configuration may facilitate other applications such as simultaneous translation or commentary (e.g., colour, political, expert, etc.), where the voice of a main speaker can be heard contemporaneously with the voice of one or more second speakers (e.g., with the main speaker's voice typically set to a volume level lower than that of a commentator's voice).

In some embodiments, a "stand-by" mode is provided, allowing for nearby users to use their audio devices normally (e.g., listening to music, a podcast, GPS directions, or engaging in a cellular call, etc.), but where the user's activity may be interrupted upon detecting that the user wants to engage a nearby other user in active conversation and/or vice-versa. As examples:

- a manual request may be made and/or accepted by one of the users through their mobile device via an appropriate user interface option;
- a user may use a voice command to request/accept/reject a connection (e.g., a virtual assistant associated with the mobile device, the audio device, and/or an application implementing Applicant's teachings);
- a user may use a voice command that specifically identifies the nearby user to connect with, whether connected, not connected, or in eavesdrop mode, etc. (e.g. "Hey Bob . . . " or "Accept Bob" may trigger an active conversation with Bob);
- connected users placed in stand-by mode may be reactivated for entry into active conversation automatically, e.g., as soon as a user is detected to be speaking after a certain period of silence; etc.

In some embodiments, an interrupted audio activity can be paused, muted, or relegated to the background (e.g., by lowering the volume) temporarily.

In some embodiments, the specific actions to be taken when a conversation will interrupt the audio stream can be user configured (e.g., when interrupting a telephone call, the user may opt to disconnect from the telephone call, put the call on hold, integrate the person on the cellular call into the main conversation, etc.).

In some embodiments, the mobile device may be returned to stand-by mode after, for example:

- a manual request to enter stand-by mode is made by one of the users through their mobile device via an appropriate user interface option;
- a user employs a voice command to enter stand-by mode (e.g., a virtual assistant associated with the mobile device, the audio device, and/or an application implementing Applicant's teachings);
- a user uses a voice command that specifically identifies a connected user (e.g., "Bye Bob . . . " may disconnect Bob, "Hold Bob . . . " may mute the user from Bob and/or vice-versa, "Stand by Bob" may keep Bob's connection open but in the background, etc.);
- users may remain connected but put on stand-by mode automatically after a certain period of silence; etc.

It will be understood that if desired, for certain audio devices and short-range wireless protocols, different audio streams may be sent to different earpieces (e.g. left and right earbuds). This may provide some flexibility if certain audio streams (e.g., when listening to eavesdropped users, or background music, etc.) are to be played contemporaneously. For instance, background or eavesdropped audio may be played at lower volume in one ear only, and may or may not be mixed with foreground audio in that ear.

In some embodiments, a "mute" option may also be provided to the user of a mobile device to temporarily silence the microphone of the mobile device and/or audio device, or to otherwise temporarily prevent audio signals originating from the user from being transmitted to other mobile devices and/or heard by other users. The user may mute himself from all connected conversation participants, or from only selected conversation participants. Engaging and/or disengaging the mute option may be controlled by one or more selectable options provided in the user interface on the mobile device, through virtual assistant command, through voice command, and/or a physical action (e.g., tapping audio device, tapping connected wearable such as a smart watch, ring, etc.), etc.

In some embodiments, a user may enter into a private conversation with a subset of conversation participants. This may be implemented, for example, by selecting one or more conversation participants for the private conversation, after which all other conversation participants are muted.

In some embodiments, sounds in the surrounding environment may be detected and re-transmitted (e.g., replayed) to users via their respective audio devices. The volume of these sounds may be amplified or reduced; the sounds may be transmitted without amplification or reduction. For example, the volume of sounds in the environment may be adjusted so that surrounding noises will continue to be heard in the background while a conversation is taking place and/or audio originating from another source is being heard via the audio device, optionally at a level similar to that for an eavesdropped conversation. This may provide certain safety benefits, potentially permitting users to maintain an awareness of their surroundings when wearing audio devices (e.g., when using noise-cancelling audio devices outdoors).

In some embodiments, announcements, conversations, and/or notifications originating from emergency sources may be automatically transmitted to the audio devices, and may interrupt any conversations in progress.

In some embodiments, the mobile device may be configured to alert and/or upon specified user input contact emergency services and/or designated contacts, which user input may include for example input provided via a touch option presented in the display (e.g., display 310 of FIG. 3), by physical action (e.g., button press, earbud tap, etc.), and/or by voice command (e.g., via virtual assistant), as examples.

In some embodiments, the audio connection established may utilize a short-range wireless communication protocol other than Bluetooth, or some other wireless communication protocol. In some embodiments, a medium-range wireless communication protocol may alternatively or additionally be employed.

In some embodiments, one or more communication protocols different from those used for audio communication between users may be employed to assist in detecting and/or identifying potential conversation participants (e.g., including near-field communication (NFC) protocols, data received via a cellular network and/or Wi-Fi, etc.). For example, in some implementations where near-field connection protocols are utilized, users may have the option of tapping or bringing their phones very close together (e.g., in a form of "digital handshake") to initiate a (e.g., Bluetooth) connection for subsequent communication. As another example, in Lecture/Conference mode-type use cases, audience members may have the option of tapping on and/or bringing their phones very close to a contactless reader, to cause data that can then be used to initiate a (e.g., Bluetooth) connection for subsequent communication to be exchanged. As another example, scanning a barcode or QR code may facilitate connection of an audience member to a host. As a further example, in some implementations, public and/or private connections over which voice communications originating from a host device may be made selectable from a list (similar to the manner in which an available Wi-Fi channel is selectable on most mobile devices).

Whether for the detection of potential conversation participants or for audio communications between users, in some embodiments, a combination of communication protocols may be alternatively and/or simultaneously employed (e.g., one protocol might be used for communication among users within a certain distance of each other while another protocol is used for users at a further distance).

In some embodiments, the audio connection may be established and/or maintained by a server or other computing device, co-operating with at least one of the user's mobile devices, and accessible through, for example, Wi-Fi and/or cellular networks.

In some embodiments, GPS technology and/or connections to other networks (e.g. Wi-Fi) may be employed to determine, or to assist in determining, the locations of, and therefore the distance between, potential conversation participants.

In a broad aspect of Applicant's technology, a wireless connection for voice communications will typically be established between users who are situated physically close enough to each other such that a face-to-face conversation is possible, or the users are at least in a position to make eye contact. As a result, in order to reduce the amount of data required to maintain a wireless communication connection and/or because of bandwidth restrictions, video will typically not be shared. However, some video sharing functionality may be implemented in certain implementations.

In some embodiments, functions permitting the sharing of a screen, contact data, hyperlinks, photos, files, and/or other documents, etc. between mobile devices during a conversation may be implemented. In some embodiments, audio input and/or output at one mobile device may also be shared with others during a conversation (e.g., music, podcasts, audio books, GPS directions, phone conversations, etc.)

In some embodiments, a maximum distance is user-configured within which conversation participants may be located and/or proposed for connection. This user-configured maximum distance may be configured to be shorter than the range for mobile devices that are reachable using the wireless protocol (e.g., to capture only a strict subset of devices and users within Bluetooth range in order to, for example, limit connections to individuals that are considered close enough to the user for in-person communication).

In some embodiments, the user may be permitted to configure a different maximum distance based on specified users and/or one or more specified categories of users (e.g., automatically connect and/or identify as a potential conversation participant any of my friends or family within Bluetooth range, but merchants or strangers must be within 3 meters before being automatically connected and/or identified as a potential conversation participant).

In some embodiments, a maximum distance may be configured by a user by, for example, manipulating a slider object in the user interface (e.g., "connect only with users within 5 metres"), setting a value in a settings menu, and/or using some other user interface element for receiving user input.

In some embodiments, various factors may be evaluated for use in predicting who, among those individuals entering with range of the mobile device, a user of the mobile device will most likely want to initiate a conversation with. This may assist in determining a subset of closest mobile devices for the user to consider connecting with, for example. Among the users of other mobile devices coming within wireless communication range and/or a specified maximum distance (those users are also referred to herein generally as a "detected subject"), a determined distance between the user and the detected subject at a particular point in time will typically be a primary factor to consider (while acknowledging this distance may be an estimate depending on the method used to determine the distance). However, other factors may be considered, including one or more of the following, by way of example and without limitation:

whether the detected subject's mobile device is already connected to an audio device;

whether and/or how often the detected subject was previously manually accepted and/or rejected to engage in communication by the user;

whether the detected subject is on a contact list associated with the user;

whether the user has associated a priority level with the detected subject (e.g., different priority levels may be associated with key contacts, family, close friends, co-workers, strangers, and/or users to block, etc.);

whether the detected subject has been mentioned and/or participated in previous electronic communications with the user (e.g., via e-mail, text, instant message, telephone calls, video conference, etc.);

whether the detected subject is identified in another personal and/or business application on the mobile device (e.g., in a calendar invite, service request, etc.);

whether the detected subject has communicated with the user in the past, and/or if the detected subject belongs to a particular category (e.g., public vs. merchant employee, workplace colleague, personal contact, etc.);

whether the user has communicated with the subjects from the same category and/or from the same location (e.g., same store, same place of work) in the past;

whether and how quickly the distance between the detected subject and the user has changed in a preceding time period (e.g., to infer whether they are likely walking or moving together, sitting or standing together, moving toward each other and stopping to talk, or temporarily passing by each other whether in the same or different direction);

a determined physical orientation of the user with respect to the detected subject (e.g., facing each other, back-to-back, etc.);

a determined activity associated with the user and/or the detected subject (e.g., shopping, biking, sleeping, etc.);

the frequency at which the user and/or the detected subject enter into conversations (e.g., using the application) with other mobile device users generally;

the number of people the user and/or the detected subject have conversed with (e.g., using the application) in the past, and potentially related data (e.g., time of day, day of week, etc.);

similarities in mobile device usage between users (e.g., common applications residing and/or executing on the mobile device, members of common social or professional network groups, common profile characteristics, etc.);

trigger words recently uttered by the user (e.g., name of the detected subject, a greeting such as "Hey" or "Hello", a word or phrase used to get someone's attention e.g., "Excuse me . . . ", etc.);

if already engaged in voice communication with a third user, whether any or all of the above factors apply to the third user (e.g., is the person coming into range "a friend of a friend", etc.);

data derived from visual or video data, where available; etc.

In some embodiments, weights may be assigned to each of the above factors when determining the likelihood that the user will want to connect in conversation, and such weights may be custom to that user.

In some embodiments, a machine learning predictive model may be trained and deployed for determining the likelihood that the user had initiated and/or will want to initiate a conversation with a given detected subject, where the training data may comprise data associated with one or more of the above-mentioned factors (also referred to herein as "features").

Figure 11:
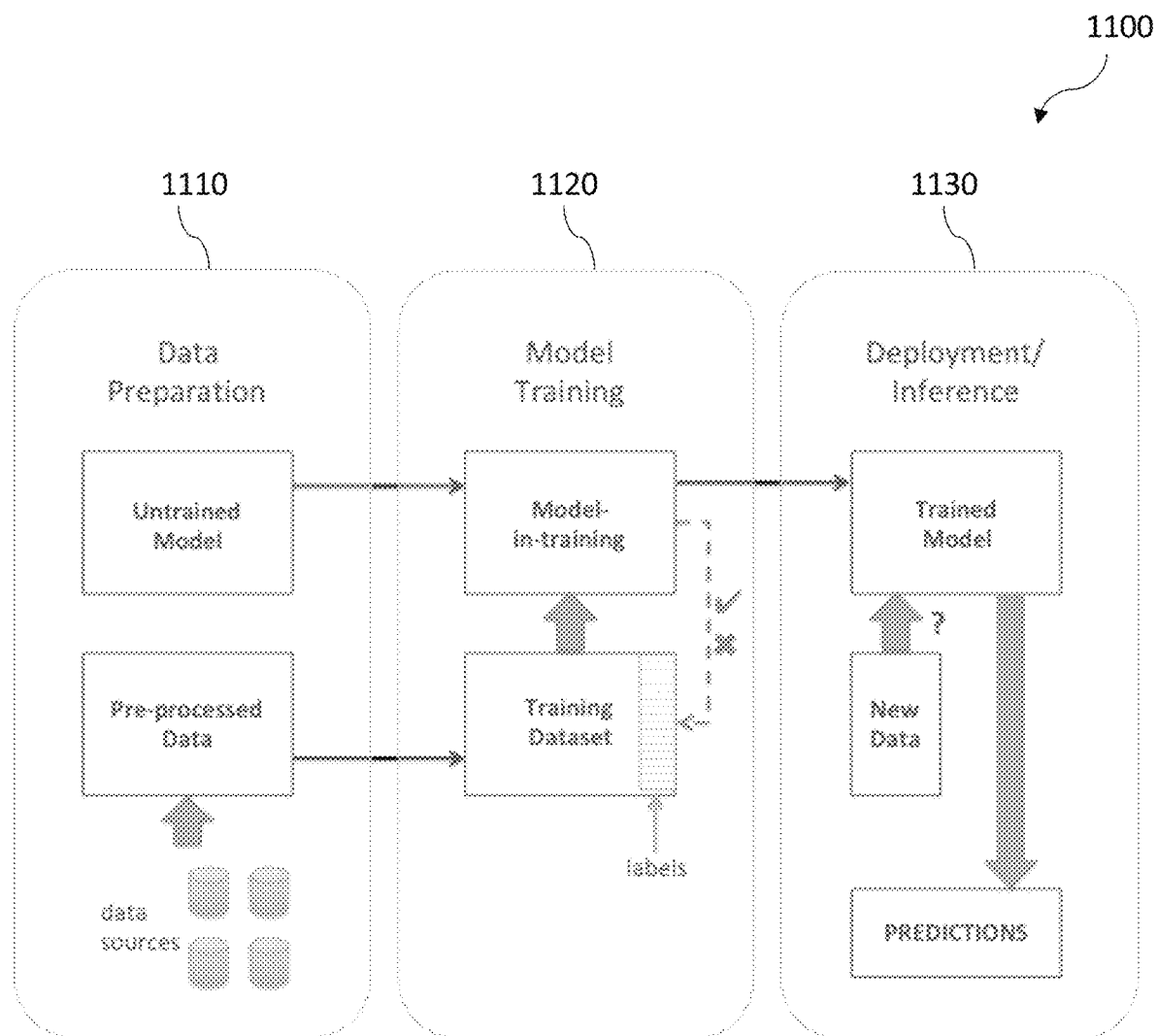
FIG. 11 is a block diagram illustrating an example machine learning pipeline.

For example, FIG. 11 is a block diagram illustrating an example machine learning pipeline, shown generally as 1100. In this example, three distinct processing stages are depicted.

At the data preparation stage 1110, data is compiled from various sources to construct a training dataset, which may comprise the aforementioned training data. In some cases, it can be appropriate to generate additional data based on "raw" data collected (e.g., via data augmentation, feature engineering, etc.). Pre-processing tasks such as data cleaning, feature scaling, or other data transformations to make the data suitable for training may also be performed. In addition, a number of potential learning algorithms ("models") are considered for use in training. Often, any selection to be made between models involves a trade-off between interpretability and accuracy.

At the model training stage 1120, patterns are learned from the training dataset with the aid of one or more machine learning algorithms. The performance (e.g., accuracy) of multiple algorithms may be compared, and individual algorithms may be further fine-tuned. Records of the training dataset typically include values for various features, and in some cases, a defined label that represents a value for an item of interest for which predictions will be sought. For example, in some embodiments, with respect to historical data, the label may represent whether the user had initiated an E2E conversation.

During training, certain records may be set aside for which the model predicts the label value based on the remaining features. However, since the actual label is already known, the model's prediction can be readily determined to be right or wrong. By tracking the accuracy of the predictions as the model is being trained, it may be possible to judge how well the model is likely to perform if deployed. Training can be permitted to continue until the level of accuracy is deemed satisfactory.

At the model inference stage 1130, a trained model that has learned patterns embodied within the training dataset is deployed for "real world" use (e.g., in an application for the mobile device). In operation, the trained model makes predictions by providing an output (i.e., a predicted label) that fits the patterns captured by the model, based on new data (i.e., new values for the corresponding features) it receives. In practice, the performance of the deployed model and the quality of the data being input may undergo periodic evaluation, and the model itself can be re-trained using fresh data and updated.

It will be understood that stages 1110 and 1120 need not be performed at the mobile device. Training of a machine learning model may be performed off-device (e.g., on a computing device, on a cloud computing platform, etc.), with the trained model potentially being deployed on the mobile device in embodiments where real-time predictions are to be made on that device.

In some embodiments, a connection may be formed automatically if a determined probability likelihood that the user desires to converse with a given detected subject meets some minimum threshold, which threshold potentially can be user-configured.

In some embodiments, different factors may be considered and/or factors may be weighted differently in order to predict the likelihood that the user will want to connect with someone automatically, versus the likelihood that the user will want to initiate a conversation with someone generally.

One or more of the above factors can additionally or alternatively be employed in e.g., a rule-based algorithm used to control how potential conversation participants are detected. For example, the application can configure the mobile device to assess the relative movements between the user and a given detected subject for a pre-set period of time (e.g., 3 seconds) before determining attempting to connect with detected subject, to minimize connections being initiated with mere passers-by.

As a further example, the application can prioritize certain factors above all others (e.g., those in my contact list or a friends list will automatically connect whenever in range, whenever I am at "home" automatically connect with anyone determined to be in that same location, etc.).

In some embodiments, data may be collected and/or transmitted to facilitate contact tracing. For the purposes of tracking potential viral transmission, there may be benefits to facilitating identification of which users have actually conversed with each other, rather than simply tracking distances between users and time spent together.

The ability to convert an audio conversation into a text-based transcript and to save the transcript to a memory or storage device may be provided in some embodiments.

The ability to record audio conversations on a mobile device, possibly for uploading to a computing device and/or a server, may be provided in some embodiments. The audio recording may be provided as a supplementary audio track to a video recording, for example.

The ability to retransmit an audio conversation to one or more remote devices may also be provided in some embodiments. For example, audio data transmitted as a result of a broadcast from a host mobile device and/or conversations between a user of the host mobile device and users of one or more audience mobile devices may be re-transmitted over the Internet, when connected. The re-transmitted audio may be provided as a supplementary audio track to a video stream, for example. This may permit, for instance, viewers of a video stream to more clearly hear questions posed by audience members who might not otherwise have had access to a microphone.

In some embodiments, the user may be notified by an audio signal when a potential conversation participant enters the user's vicinity. For example, the user may hear a beep, ring, chime, voice announcement, etc. when such a nearby user is detected. Additionally or alternatively, textual and/or other notification may be provided at the user's mobile device.

In some embodiments, different sounds and/or notifications may be used to distinguish between different categories of potential conversation participants, such as contacts versus non-contacts and/or merchants/employees versus public. Different sounds and/or notifications may also be used to distinguish between different types of contacts: e.g., a unique sound can be attributed to each of: known personal contacts, known business contacts, connections from one or more social platforms, and/or representatives of selected merchants, etc.). This may allow the user to discreetly identify nearby individuals with which a conversation may be desirable. Furthermore, whether or not the nearby person will automatically be entered into conversation with the user may also be configurable, and different categories of users may be associated with different connection options.

In some embodiments, different levels of security (e.g., encryption) may also be applied to different conversations depending on the category of a connected mobile device user. More generally, in some embodiments, encryption may be applied to communications to increase security. Certain connections may be associated with two or more security levels (e.g., public/private, low/medium/high, etc.), with different encryption strengths (including possibly none) and/or techniques applied to each. Different user authentication requirements for conversation participants may also be established that are dependent upon security level, in some embodiments.

In some embodiments, users may take actions (e.g., accept and/or reject connection request; commence, terminate, and/or pause conversation, etc.) via a touch option presented in the display (e.g., display 310 of FIG. 3), by physical action (e.g., button press, earbud tap, etc.), and/or by voice command (e.g., via virtual assistant), as examples.

A system comprising multiple mobile devices configured in accordance with embodiments and features described herein may be implemented. A master or administrator device may be given permissions to configure application settings and/or control the application operation on one or more of the mobile devices (e.g., to establish connections, to accept or reject conversation requests, to mute conversation participants, etc.). This may have advantages for use cases where one or more users may not have convenient physical access to their mobile devices.

Although certain modes have been described as initiating detection of potential conversation participants after a user opens the application on their mobile device while connected to an audio device, acts of the described methods may still continue be performed even if the mobile device is not yet connected to the audio device and/or the audio device is connected to the mobile device but is not yet worn. In those cases, the user may be prompted (e.g., via textual and/or audio prompt) to wear the audio device.

It will be understood by persons skilled in the art that the microphone of an audio device can be a physically separate device (e.g., worn on the upper body, arms, forehead, etc.); it need not be physically integrated into an apparatus worn in/on/over the ears or on the head.

Some implementations may have accessibility applications. In some embodiments, the audio device may comprise a hearing aid and/or other assistive-listening device.

Although some of the illustrations depict one audio device connected to a given mobile device, depending on the type of connection and/or communication protocol used, multiple audio devices may be connected to the same given mobile device when in use.

It will be understood that references herein to "application" (of the type executable on the mobile device) does not imply that it is necessary that the functionality described be implemented in a stand-alone software application running in the foreground. For example, at least some of the functions may be integrated into other applications (e.g., with smartphone utility applications, contact applications, music applications, sports trackers, social media applications, etc.). At least some functions may also be enabled even if the application is running in the background.

In some embodiments, an icon identifying the application may be displayed on the display of the mobile device when the application is executing.

As mentioned, at least some acts described herein may be performed by at least one processor of a mobile device. The mobile device on which Applicant's technology is implemented may comprise a two-way wireless communication device having voice and data communication capabilities. The mobile device may incorporate a communication subsystem with a design that may be dependent upon the communication network within which the mobile device will operate, but will typically include at least a receiver, a transmitter, and other electronic components. At least one processor controls the overall operation of the mobile device. The processor(s) will, in operation, interact with numerous device subsystems including volatile and non-volatile storage or memory subsystems (e.g., within which operating system software used by the processor(s) may be stored), one or more displays, input/output subsystems (e.g., that control the audio devices described herein), short-range communication subsystems, ports, and so on.

By way of further illustration, FIG. 12 is a block diagram illustrating example components of a system 1200 comprising a mobile device 1210 and an audio device 1240 in accordance with at least one example embodiment.

In some embodiments, mobile device 1210 comprises a mobile phone, for example a smartphone. However, in variant embodiments mobile device 1210 comprises one or more devices capable of wireless communication, such as a tablet computer, a notebook computer, a laptop computer, a desktop computer, a handheld computer, a television, a gaming device, a personal digital assistant, a handheld device, a wearable device, a sensor device, an Internet of Things (IoT) device, a hybrid device, a vehicular device, an audio device, a video device, an audio-video device, or the like.

In some embodiments, mobile device 1210 may comprise, for example, one or more processors 1220, an input/output subsystem interface 1222, one or more memory units 1224 and/or storage units 1226, and a wireless communication subsystem 1228 that may comprise one or more wireless radios (e.g., Bluetooth radio) that includes circuitry and/or logic to perform wireless communication between the mobile device 1210 and other mobile devices and/or other devices (e.g., Bluetooth devices).

The functions of processor(s) 1220 may be provided through the use of dedicated hardware and/or hardware capable of executing software in association with appropriate software. Functions may be provided by a single shared processor, or multiple processors, some of which may be shared. In some implementations, processor(s) 1220 may generally comprise for example, a Central Processing Unit (CPU) and/or a Digital Signal Processor (DSP), and one or more processor cores. Processor(s) 1220 execute instructions, for example, of an operating system of mobile device 1210 and/or of one or more software applications.

Input/Output Interface 1222 may comprise or provide access to one or more input units, such as a keypad, a keyboard, a mouse, a touch screen, a touch pad, a track ball, a stylus, a microphone, and/or other suitable input device. Input/Output Interface 1222 may comprise or provide access to one or more output units, such as a monitor, a screen, a touch screen, a flat panel display, a light emitting diode display, a liquid crystal display, a plasma display, one or more audio speakers, one or more headphones and/or earphones, and/or other suitable output device.

Memory units 1224 (which may be individually or collectively referred to herein as "memory") may comprise, for example, Random Access Memory (RAM), Read Only Memory (ROM), Dynamic RAM (DRAM), Synchronous DRAM (SDRAM), flash memory, volatile memory, non-volatile memory, cache memory, and/or other suitable memory units.

Storage units 1226 (which may be individually or collectively referred to herein as "storage") may comprise, for example, a hard disk drive, a floppy disk drive, a compact disk drive, a digital video disk drive, and/or other suitable removal or non-removable storage unit.

Data processed by mobile device 1210 may be stored in memory units 1224 and/or storage units 1226.

Wireless communication subsystem 1228 enables mobile device 1220 to communicate data and/or signals with other devices via a wireless medium, which may include, for example, a radio channel, a Bluetooth channel, an RF channel, a Wi-Fi channel, a cellular channel, an infrared channel, a Global Navigation Satellite System channel, and/or other wireless channel. In some embodiments, mobile device 1220 may comprise hardware for sending messages to and receiving messages from a wireless network that offers cellular telephony service. To identify a subscriber for network access, the mobile device 1220 may utilize a Subscriber Identity Module or a Removable User Identity Module (SIM/RUIM) card for communication with the wireless network. Alternatively, user identification information may be programmed into the memory 1224.

In some embodiments, mobile device 1210 may comprise or perform one or more functionalities of Bluetooth devices. Wireless communication subsystem 1228 may comprise one or more Bluetooth radios including circuitry and/or logic to perform wireless communication in accordance with a Bluetooth protocol. A Bluetooth radio may comprise one or more wireless receivers 1230 and/or one or more wireless transmitters 1232, including circuitry and/or logic to receive and/or transmit, respectively, wireless communication signals, RF signals, transmission streams, packets, frames, blocks, messages, data items, and/or data. Generally, a Bluetooth radio may comprise radio frequency (RF) components, baseband components, modulation components, demodulation components, and/or other components. Any such components may comprise circuitry and/or logic. A Bluetooth radio may also comprise amplifiers, converters (analog-to-digital and/or digital-to-analog), filters, and/or other components to facilitate wireless communication in accordance with a Bluetooth protocol.

In some embodiments, audio device 1240 may be a wireless device, such as a Bluetooth device comprising a Bluetooth radio as previously described. Mobile device 1210 and audio device 1240 may be configured to communicate voice signals over a Bluetooth short-range wireless connection. Audio device 1240 may comprise a Bluetooth Low Energy (LE) compatible device. Audio device 1240 may comprise one or more integrated microphones. Audio device 1240 may be of earbud type, or of another type, as previously described herein.

It will be understood by persons skilled in the art that mobile device 1210 will comprise other components not explicitly identified in FIG. 12. These may include, for example, power supply units, communication buses and/or units, network subsystems and/or interfaces, media processing subsystems and/or interfaces, and/or other components. Mobile device 1210 may also comprise components and/or functionality for determining its location, direction, or orientation, such as, for example, a GPS receiver, compass, gyroscope, and/or accelerometer.

The headings and sub-headings used in the foregoing description are provided for readability and are not intended to limit the scope of the present technology.

Various aspects, embodiments, implementations or features described herein can be used separately or in any combination. Various aspects of the described embodiments can be implemented by software, hardware, or a combination of hardware and software.

The described embodiments can also be embodied as computer-readable instructions on a computer-readable medium, including non-transitory computer-readable media.

The computer-readable medium comprises any data storage device that can store data that can thereafter be read by a computer system. Examples of the computer-readable medium include, for example and without limitation, read-only memory, random access memory, compact disks, digital video disks, magnetic tape, hard disk drives, USB keys, flash memory cards, solid state drives, and optical data storage devices. The computer-readable medium can also be distributed over network-coupled computer systems so that computer-readable instructions (e.g., as code) are stored and executed in a distributed fashion.

The examples and conditional language recited herein are primarily intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope. Further, as an aid to understanding, certain simplified descriptions have been described herein. Persons skilled in the art would understand that various implementations of the present technology may be of greater complexity and/or subject to modifications within its spirit and scope.

In the context of the present description, unless expressly provided otherwise, the words "first", "second", "third", etc. have been used as adjectives only for the purpose of distinguishing the nouns they modify from each other, and not for the purpose of describing any particular order or relationship between the nouns.

More generally, persons skilled in the art will understand that acts described herein may be combined, sub-divided, and/or reordered without departing from the Applicant's teachings of the present technology. At least some acts may be executed in parallel or in series.

As used herein, the term "and/or" (and potentially the symbol "/" depending on the context) is intended to represent an inclusive-or. For example, "X and/or Y" is intended to mean X or Y or both. As a further example, "X, Y, and/or Z" is intended to mean X or Y or Z or any combination thereof.

The invention claimed is:

1. A method of establishing a short-range wireless connection for voice communications between wireless audio devices coupled to each of a plurality of mobile devices, the method performed by at least one processor of a first mobile device, wherein the method comprises:

detecting one or more closest second mobile devices within a short-range wireless communication range of the first mobile device; and for each of at least one of the one or more closest second mobile devices:

establishing, in accordance with a short-range wireless standard, the short-range wireless connection for voice communications between a first wireless audio device communicatively coupled to the first mobile device and a second wireless audio device communicatively coupled to the second mobile device;

wherein the establishing the short-range wireless connection for voice communications between the first wireless audio device and the second wireless audio device is performed automatically in response to the detecting the one or more closest second mobile devices within the short-range wireless communication range of the first mobile device.

2. The method of claim 1, wherein the short-range wireless standard comprises a Bluetooth Low Energy (LE) Audio standard.

3. The method of claim 1, wherein the short-range wireless communication range comprises a Bluetooth range.

4. The method of claim 1, wherein the short-range wireless communication range comprises a near-field communication (NFC) range.

5. The method of claim 1, wherein the short-range wireless communication range comprises a Wi-Fi range.

6. The method of claim 1, wherein the first wireless audio device to which the first mobile device is communicatively coupled comprises a wireless audio device selected from the following group: in-ear audio device, on-ear audio device, and over-the-ear audio device.

7. The method of claim 6, wherein the first mobile device is communicatively coupled to the wireless audio device via at least one Bluetooth LE isochronous channel.

8. The method of claim 1, further comprising:
transmitting, at a first volume, first audio signals originating from a first source to the first wireless audio device; and
transmitting, at a second volume, second audio signals originating from a second source to the first wireless audio device contemporaneously with the first audio signals.

9. The method of claim 8, wherein:
the first source comprises at least one closest second mobile device for which the short-range wireless connection for voice communications is established; and
the second source comprises at least one other closest second mobile device for which the short-range wireless connection for voice communications is established.

10. The method of claim 9, wherein the first source is associated with a first user category, and the second source is associated with a second user category that is different from the first user category.

11. The method of claim 1, further comprising:
transmitting voice signals to each of the at least one of the one or more closest second mobile devices over the short-range wireless connection.

12. The method of claim 11, further comprising:
receiving voice signals from each of the at least one of the one or more closest second mobile devices over the short-range wireless connection.

13. The method of claim 12, further comprising receiving voice signals from each of a selection of the at least one of the one or more closest second mobile devices over the short-range wireless connection.

14. The method of claim 13, further comprising:
for each closest second mobile device belonging to the selection:
receiving a respective speaking request at the first mobile device; and
receiving a permission confirmation at the first mobile device;
wherein the receiving voice signals is performed in response to the receiving the permission confirmation.

15. The method of claim 1, wherein the one or more closest second mobile devices are associated with a predefined user category.

16. The method of claim 1, further comprising determining that the one or more closest second mobile devices is at a distance that is less than or equal to a prescribed maximum distance from the first mobile device.

17. A first mobile device for establishing a short-range wireless connection for voice communications between a first wireless audio device coupled to the first mobile device and a second wireless audio device coupled to each of one or more second mobile devices, the first mobile device comprising:
at least one processor;
at least one memory; and
at least one short-range wireless communication subsystem;
wherein the first mobile device is communicatively couplable to the first wireless audio device; and
wherein the at least one memory comprises instructions which, upon execution by the at least one processor, causes the at least one processor to perform a method of establishing a short-range wireless connection for voice communications, wherein the method comprises:
detecting one or more closest second mobile devices within a short-range wireless communication range of the first mobile device; and
for each of at least one of the one or more closest second mobile devices:
establishing, in accordance with a short-range wireless standard, the short-range wireless connection for voice communications between the first wireless audio device communicatively coupled to the first mobile device and the second wireless audio device communicatively coupled to the second mobile device;
wherein the establishing the short-range wireless connection for voice communications between the first wireless audio device and the second wireless audio device is performed automatically in response to the detecting the one or more closest second mobile devices within the short-range wireless communication range of the first mobile device.

18. A non-transitory computer-readable medium comprising instructions which, upon execution by at least one processor, cause the at least one processor to perform a method of establishing a short-range wireless connection for voice communications between wireless audio devices coupled to each of a plurality of mobile devices, wherein the method comprises:
detecting one or more closest second mobile devices within a short-range wireless communication range of the first mobile device; and
for each of at least one of the one or more closest second mobile devices:
establishing, in accordance with a short-range wireless standard, the short-range wireless connection for voice communications between a first wireless audio device communicatively coupled to the first mobile device and a second wireless audio device communicatively coupled to the second mobile device;
wherein the establishing the short-range wireless connection for voice communications between the first wireless audio device and the second wireless audio device is performed automatically in response to the detecting the one or more closest second mobile devices within the short-range wireless communication range of the first mobile device.

* * * * *